US011645321B2

(12) United States Patent
Roller et al.

(10) Patent No.: US 11,645,321 B2
(45) Date of Patent: May 9, 2023

(54) CALCULATING RELATIONSHIP STRENGTH USING AN ACTIVITY-BASED DISTRIBUTED GRAPH

(71) Applicant: SalesForce, Inc., San Francisco, CA (US)

(72) Inventors: William Christopher Fama Roller, San Francisco, CA (US); Shardul Vikram, San Jose, CA (US); Alex Michael Noe, Palo Alto, CA (US); Noah William Burbank, Palo Alto, CA (US); Alexis Roos, Palo Alto, CA (US); Rohith Ramprasad, San Francisco, CA (US); Joseph Gerald Keller, San Francisco, CA (US); Gabriel Starr Krupa, Petaluma, CA (US); Scott Walter Bishel, Erie, CO (US); Praveen Innamuri, Santa Clara, CA (US)

(73) Assignee: Salesforce, Inc., San Francisco, CA (US)

( * ) Notice: Subject to any disclaimer, the term of this patent is extended or adjusted under 35 U.S.C. 154(b) by 588 days.

(21) Appl. No.: 15/803,412

(22) Filed: Nov. 3, 2017

(65) Prior Publication Data

US 2019/0138653 A1 May 9, 2019

(51) Int. Cl.
*G06F 16/35* (2019.01)
*G06T 11/20* (2006.01)
*G06F 16/2457* (2019.01)
*G06Q 10/10* (2023.01)
(Continued)

(52) U.S. Cl.
CPC ...... *G06F 16/358* (2019.01); *G06F 16/24575* (2019.01); *G06F 40/194* (2020.01); *G06F 40/35* (2020.01); *G06Q 10/10* (2013.01); *G06T 11/206* (2013.01)

(58) Field of Classification Search
CPC ............................ H04L 51/32; G06F 16/9024
See application file for complete search history.

(56) References Cited

U.S. PATENT DOCUMENTS

| | | | |
|---|---|---|---|
| 9,727,644 B1 * | 8/2017 | Teng | G06Q 50/01 |
| 9,760,619 B1 * | 9/2017 | Lattanzi | G06F 16/285 |
| 9,946,789 B1 * | 4/2018 | Li | H04L 51/12 |

(Continued)

*Primary Examiner* — Mohammad S Rostami
(74) *Attorney, Agent, or Firm* — Holland & Hart LLP

(57) ABSTRACT

Methods, systems, and devices for analyzing communication messages (e.g., emails or activities) to determine relationship strength using a distributed graph are described. In some systems, a user may be associated with a specific tenant. A database server of the system may receive communication messages associated with the user and a target user. The server may perform a natural language processing (NLP) analysis on the communication messages to extract metadata, and may generate or update a distributed graph indicating connections between users based on the extracted metadata. Using the connections of the graph, the server may calculate a closeness score between the user and the target user. Additionally, the server may calculate closeness scores between the target and other users associated with the tenant, and may determine the users with the greatest closeness scores. The server may send a suggestion for the determined users to initiate communication with the target.

20 Claims, 12 Drawing Sheets

(51) Int. Cl.
  *G06F 40/35* (2020.01)
  *G06F 40/194* (2020.01)

(56) References Cited

U.S. PATENT DOCUMENTS

| | | | | |
|---|---|---|---|---|
| 10,015,182 | B1* | 7/2018 | Shintre | H04L 63/1441 |
| 2010/0161621 | A1* | 6/2010 | Peters | G06F 16/16 |
| | | | | 707/749 |
| 2010/0318613 | A1* | 12/2010 | Souza | G06Q 10/107 |
| | | | | 709/206 |
| 2013/0210493 | A1* | 8/2013 | Tai | H04W 4/12 |
| | | | | 455/566 |
| 2013/0218965 | A1* | 8/2013 | Abrol | H04L 29/08936 |
| | | | | 709/204 |
| 2014/0089418 | A1* | 3/2014 | Davenport | H04L 51/16 |
| | | | | 709/206 |
| 2014/0149418 | A1* | 5/2014 | Qin | G06Q 50/01 |
| | | | | 707/740 |
| 2014/0310780 | A1* | 10/2014 | Siwik | H04L 63/108 |
| | | | | 726/4 |
| 2015/0039539 | A1* | 2/2015 | Shivashankar | G06N 5/02 |
| | | | | 706/12 |
| 2015/0220995 | A1* | 8/2015 | Guyot | G06Q 50/01 |
| | | | | 705/14.66 |
| 2016/0117355 | A1* | 4/2016 | Krishnamurthy | H04L 67/22 |
| | | | | 707/749 |
| 2016/0179805 | A1* | 6/2016 | Bolshinsky | G06F 16/248 |
| | | | | 707/723 |
| 2016/0352667 | A1* | 12/2016 | Pickett | H04L 67/22 |
| 2016/0380936 | A1* | 12/2016 | Gunasekara | H04L 51/212 |
| | | | | 709/206 |
| 2017/0064020 | A1* | 3/2017 | Obukhov | H04L 67/306 |
| 2017/0091246 | A1* | 3/2017 | Risvik | G06F 16/9024 |
| 2017/0171342 | A1* | 6/2017 | Wang | H04L 67/322 |
| 2017/0199920 | A1* | 7/2017 | Pearson | G06F 16/9024 |
| 2017/0201587 | A1* | 7/2017 | Appleyard | H04L 67/14 |
| 2017/0289087 | A1* | 10/2017 | Chang | H04L 51/24 |
| 2017/0295250 | A1* | 10/2017 | Samaranayake | H04L 51/224 |
| 2017/0344610 | A1* | 11/2017 | Evnine | G06F 16/9535 |
| 2017/0364702 | A1* | 12/2017 | Goldfarb | H04L 63/14 |
| 2017/0366416 | A1* | 12/2017 | Beecham | H04L 45/50 |
| 2018/0006979 | A1* | 1/2018 | Barsness | G06F 40/253 |
| 2018/0013861 | A1* | 1/2018 | Howard | G06F 16/951 |
| 2018/0018707 | A1* | 1/2018 | Berry, Jr. | G06Q 30/0257 |
| 2018/0083905 | A1* | 3/2018 | Jayaram | H04L 51/16 |
| 2018/0083907 | A1* | 3/2018 | Perlow | H04L 51/22 |
| 2018/0239796 | A1* | 8/2018 | Song | G06F 16/282 |
| 2018/0268615 | A1* | 9/2018 | Smet | G06T 19/006 |
| 2018/0278567 | A1* | 9/2018 | Archer | H04L 51/24 |
| 2018/0287981 | A1* | 10/2018 | Lei | H04L 67/22 |
| 2018/0349362 | A1* | 12/2018 | Sharp | G06F 16/14 |
| 2018/0351903 | A1* | 12/2018 | Allen | H04L 12/1813 |
| 2019/0044907 | A1* | 2/2019 | Barijough | H04L 51/12 |
| 2019/0114362 | A1* | 4/2019 | Subbian | G06F 16/9535 |

* cited by examiner

CALCULATING RELATIONSHIP STRENGTH USING AN ACTIVITY-BASED DISTRIBUTED GRAPH

FIELD OF TECHNOLOGY

The present disclosure relates generally to database systems and data processing, and more specifically to calculating relationship strength using an activity-based distributed graph.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales. In many cases, the user may be part of an organization, along with one or more other users.

In some cases, the user may desire to communicate with a new contact (e.g., to make a sale, to obtain contact information, etc.). In these cases, the success rate of communication may be low for a user with limited or no previous communication with the contact. This success rate may increase if the communication is performed by another user in the organization who has a previously established relationship (e.g., through communications) with the contact. However, the user may not be able to efficiently or accurately determine which user in the organization has the strongest connection to the contact, and therefore may not be able to identify the user with the highest probability of success when initiating the communication.

DETAILED DESCRIPTION

Figure 1:
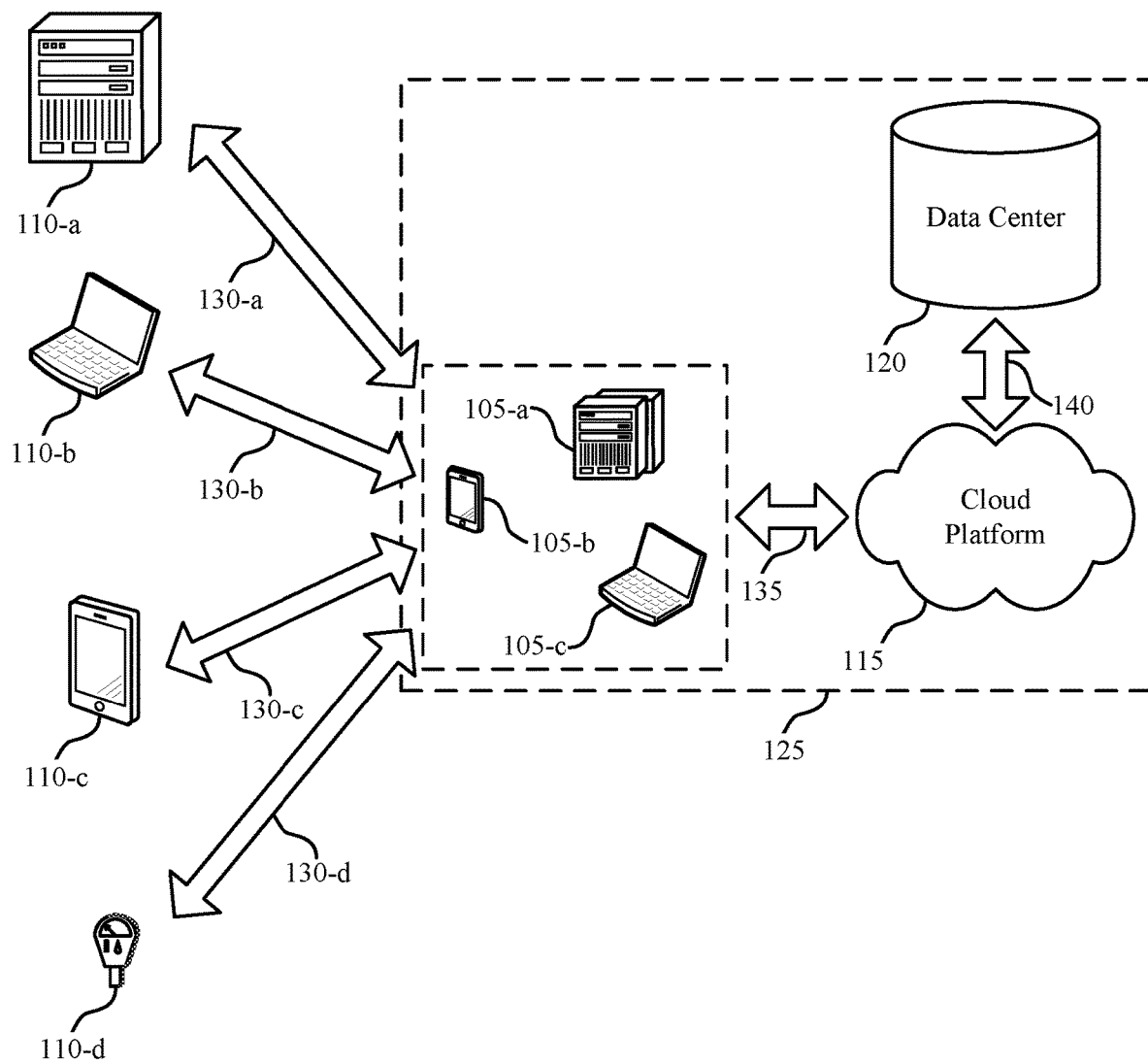
FIG. 1 illustrates an example of a system for communication data processing at a database server that supports calculating relationship strength using an activity-based distributed graph in accordance with aspects of the present disclosure.

In some database systems, users (e.g., individuals distinct from other users based on any number of characteristics, such as name, email address, phone number, etc.) may operate within a group referred to as an organization. Within the organization, the users may share data, communicate, and operate as separate components of a single entity. For example, in a sales scenario, the users may be individual salespeople working to generate profits for a company (e.g., the organization or entity). These users may communicate and interact with other contacts—referred to as targets—who may be within the organization (and, accordingly, referred to as a user) or outside the organization. Each user and target may be differentiated based on a corresponding user identifier.

The database system may host a "closest connections" service on one or more database servers or server clusters. The closest connections service may process communication messages associated with the users and targets to generate a distributed graph. The communication messages may include emails, calendar events, service tickets, text messages, voice calls, social media messages, documents, activities, or any combination of these. The closest connections service may perform a natural language processing (NLP) analysis on the communication messages to extract metadata or other information, such as timestamps, associated users, or styles of the communication messages. The closest connections service may use the extracted information to generate a distributed graph (e.g., using batches of communication messages stored in memory) or update an existing distributed graph (e.g., using realtime or pseudo-realtime communication messages streams). The distributed graph may represent the relationships within an organization, as well as relationships with targets external to the organization. For example, the nodes of the graph may represent users and targets, and the edges of the graph may represent connections, along with corresponding connection strength values, between the users and targets.

The closest connections service may utilize this distributed graph to provide a user of an organization with insights into which user or users within the organization have the strongest connections to a target. For example, a user may send a request message to the closest connections service to retrieve information about users connected to a specified target. The closest connections service may utilize the distributed graph to calculate closeness scores for the users within the organization connected to the target. The service may rank the connected users in descending order by closeness score, and may return information related to one or more of the connected users based on a configured number of connected users to return. The selected users may be the users ranked first by closeness score. Rather than the user contacting the target directly, the user may request one or more of the selected connected users to contact the target based on their connection strength and communication history. Having users with strong connections contact targets, as opposed to users with no communication history with the targets, may greatly increase the chances of a successful communication (e.g., receiving a reply in response, scheduling a meeting, making a sale, etc.).

Aspects of the disclosure are initially described in the context of an environment supporting an on-demand database service. Additional aspects of the disclosure are described with respect to a system, a distributed graph, example user interfaces, NLP procedures, and a process flow. Aspects of the disclosure are further illustrated by and described with reference to apparatus diagrams, system diagrams, and flowcharts that relate to calculating relationship strength using an activity-based distributed graph.

FIG. 1 illustrates an example of a system 100 for cloud computing that supports calculating relationship strength using an activity-based distributed graph in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some systems 100, multiple cloud clients 105 may be part of a same organization or tenant. The cloud platform 115 and data center 120 may service multiple separate organizations or tenants (e.g., within a multi-tenant database system). The cloud platform 115 (e.g., one or more database servers or server clusters) may host a "closest connections" service. The closest connections service may process communication messages, including messages transmitted between cloud clients 105 and/or contacts 110 and activities associated with cloud clients 105 and/or contacts 110, and may perform NLP, metadata extraction, or both on the communication messages. The NLP and metadata extraction may identify activity data to be used for activity-based distributed graph generation and upkeep. The closest connections service may generate a distributed graph, where the nodes of the graph represent users and targets (e.g., corresponding to cloud clients 105, contacts 110, or both) and the edges of the graph represent connections—and corresponding connection strengths—between the users and targets.

The closest connections service may utilize this distributed graph to provide a user of an organization with insights into which user or users within the organization have the strongest connections to a target. The target may be either a cloud client 105 or a contact 110 (e.g., a new contact 110 that the user has not previously interacted with). The user may send a request message to the cloud platform 115 running the closest connections service indicating a target and, in some cases, a number of connected users. The closest connections service may utilize the distributed graph to calculate closeness scores between the users within the organization and the target. These connections may be based on past communications or activities between the users and the indicated target. The service may rank the connected users in descending order by closeness score, and may return information related to one or more of the connected users based on the number of connected users to return. The selected users may be the highest ranked users (i.e., the users with the greatest closeness scores). Rather than the user contacting the target directly, the user may request one or more of the selected connected users to contact the target based on their connection strength and communication history.

Figure 2:
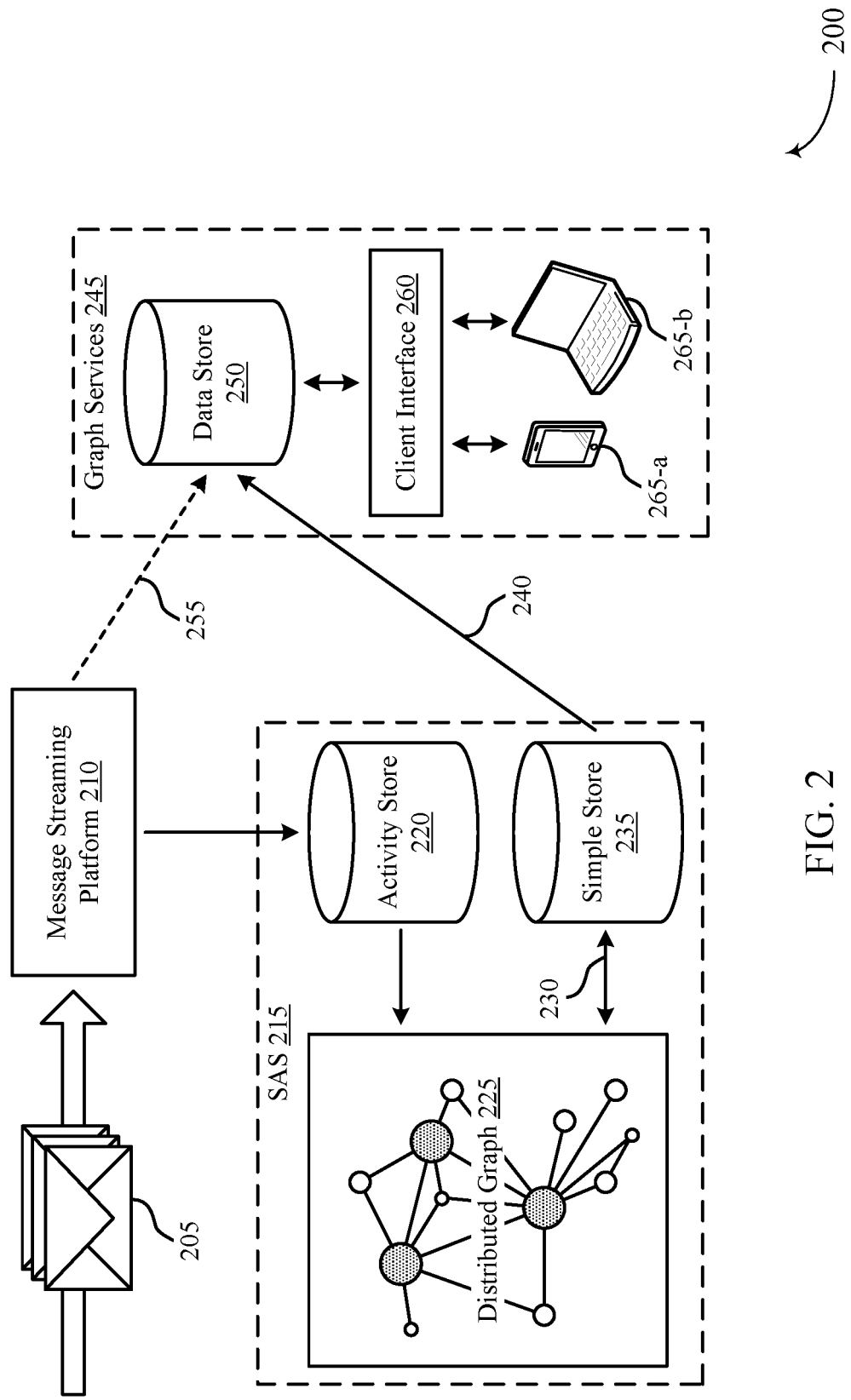
FIG. 2 illustrates an example of a system that supports calculating relationship strength using an activity-based distributed graph in accordance with aspects of the present disclosure.

FIG. 2 illustrates an example of a system 200 that supports calculating relationship strength using an activity-based distributed graph in accordance with aspects of the present disclosure. The system 200 may include platforms, processes, and data stores, which may be components of a cloud platform or a database or data center, such as the cloud platform 115 or data center 120 described above with reference to FIG. 1. For example, the processes described below may be performed by a "closest connections" service, which may run on a database server, a server cluster, or a set of servers or server clusters. The system 200 may operate to provide context to communication messages 205, as well as to determine the most valuable users within an organization to communicate with certain targets.

A user may correspond to any unique individual distinct from other users based on any number of characteristics, including but not limited to a name, an email address, a phone number, or an identifying number. An organization may be any group of users associated by a shared characteristic (e.g., a business, a corporation, a club, etc.). A target may correspond to a user or an organization that a first user or organization attempts to connect with. In some cases, the user and the target may both be part of a same organization. Each user and target may be differentiated based on a corresponding user identifier.

In many systems, users within a first organization may communicate with users outside of the organization. For example, in a sales scenario, a salesperson of a first company may interact via emails, voice calls, or texts with an outside client. In some cases, if one user in the organization desires to contact someone outside of the organization (e.g., referred to as a target user, or just a target), another user in the same organization may already have an established relationship (e.g., email exchanges, in-person meetings, etc.) with the desired target. Having the user with the previously established relationship contact the target—instead of having a user with no previous relationship cold-call the target—may increase the likelihood of a sale. Additionally, the strength of relationships between users and targets may be important in determining which user should initiate communication.

A system 200 may have information available to determine the relationship strength between one or more users and targets. For example, the system 200 may include a database with archived communication messages 205. Additionally or alternatively, the system 200 may receive communication messages 205 in realtime as part of a communication stream. These communication messages 205 may include emails, calendar invites, text messages, or any other messages between a group of users. Additionally or alternatively, these communication messages 205 may be examples of documents associated with multiple users, or may identify actions or activities performed by or corresponding to multiple users. The communication messages 205, or information contained within the communication messages 205, may alternatively be referred to as activity data.

The communication messages 205 may be sent to a message streaming platform 210 (e.g., either as a realtime stream or in batches from memory). The message streaming platform 210 may operate as a data streaming pipeline from one or more applications or databases to the closest connections service. The message streaming platform 210 may convert communication messages 210 from one or more formats into a format usable by a statistical analysis system (SAS) 215. For example, the message streaming platform 210 may receive emails, calendar events, text messages, documents, application activities, or any number of other types of communication messages 205. The message streaming platform 210 may convert these messages—or text associated with these messages—into an SAS-usable format.

The message streaming platform 210 may send this information to the SAS 215. Either the message streaming platform 210 or the SAS 215 may determine activity data from this information in the SAS-usable format. The system 200 may store the activity data in an activity store 220, and may use the stored activity data when generating or updating a distributed graph 225 of the connections. For example, in some cases, upon initiation of the closest connections service, the system 200 may retrieve one or more batches of activity data from the activity store 220 to generate a distributed graph 225. Additionally, in some cases, the system 200 may periodically or aperiodically update the distributed graph 225 using new activity data (e.g., corresponding to communication messages 205) identified by the system 200.

To determine the distributed graph 225, the system 200 may identify connection strengths between multiple combinations of users and targets. Connection strengths may be activity-based, and may be determined by using NLP on the communication messages 205 or corresponding activity data. For example, the system 200 may use NLP to extract metadata or other information from the communication messages 205, and may use this data to determine connection strengths between users and targets. The closest connections service may utilize many different parameters to calculate the connection strength between a user and a target. For example, the closest connections service may calculate connection strength based on a volume of messages or activities between the user and target. Additionally, the connection strength may be based on closeness, recency, calendar activity, email activity, additional activities, communication content, communication style, influencer measure, power measure, or any combination of these or other parameters associated with user activity.

Closeness may refer to how close an interaction between the user and the target is to a one-on-one interaction. For example, if a communication message 205 or activity between the user and the target includes one or more other users, the relationship between the user and the target may not be as strong as if the user and the target often interact (e.g., send messages, meet, etc.) without any other users involved. The closeness may correspond to a function associated with the attention of the target. This function may be used to modify the connection strength of the user and the target. For example, if n users and targets are involved in a communication message 205, the closeness function may be represented as $$\frac{1}{n-1}.$$

If a certain activity corresponds to a certain connection strength (e.g., an email may correspond to some connection value, such as a value of 1), then the closest connections service may multiply this connection value by the closeness function to determine an adjusted value for the activity. Accordingly, a one-on-one meeting may result in the full connection value for the activity, while meetings with more attendees may result in a fraction of the connection value.

In some cases, the closest connections service may implement two vectors of closeness. For example, the service may determine a closeness value between the target and a first user within an organization using a standard procedure. However, the service may additionally determine a closeness value between the first user and a second user within the organization. In this case, if the second user searches for a closest connection to the target, the distributed graph 225 may indicate the connection strength of the first user to the target and the connection strength of the second user to the first user. In some organizations (e.g., large organizations with hundreds or thousands of users), this two vectors of closeness may further modify the connection strength values. For example, even if the first user has the strongest connection with the target, the first user and second user may share limited or no communications or activities. In these cases, a third user (e.g., a user with a strong connection with both the second user and the target) may have a stronger two vector closeness than the first user, despite having a slightly lower connection strength with the target.

The closest connections service may additionally or alternatively determine connection strength based on the recency or frequency of activities. Using NLP or metadata extraction, the system 200 may determine a timestamp for each communication message 205. The closest connections service may weight messages and activities based on the recency of the corresponding timestamps. For example, an email between a user and a target sent one year ago may result in a lower connection strength than an email sent one week ago. Accordingly a smaller volume of messages sent more recently may result in a stronger connection strength than a larger volume of messages sent a long time ago. The closest connections service may implement a recency function to determine the weighted values based on the timestamps. Additionally, the frequency or volume of communication messages 205 may affect the connection strength. For example, a greater frequency or volume of communication may indicate a greater connection strength. Similarly, shorter response times or reciprocity may indicate greater connection strength. The closest connections service may identify a message sent from a user to a target, and may determine whether a message was received in response. Messages not reciprocated may correspond to lower connection strength values, while messages reciprocated within a short period of time (e.g., based on the timestamps) may correspond to higher connection strength values.

Different types of activities or messages may result in different connection strengths. In some cases, a user or organization may configure the corresponding connection values for different types of communication. For example, an in-person meeting may correspond to a higher connection value than a video conference, while the video-conference may in turn correspond to a higher connection value than an email. Additionally or alternatively, the system 200 may use NLP to determine content or style of a communication message 205 (e.g., an email). The closest connections service may further categorize communication messages 205 based on the determined content or style. For example, within the email communication type, emails categorized as "professional" may correspond to a different connection value than "social" or "personal" emails.

In some cases, the system 200 may determine influencer or power measures associated with a user or user identifier. For example, the system 200 may calculate or track statistics associated with each user. The connection strengths (e.g., with any targets) may be modified based on the user-specific statistics. In one case, if a user has a high success rate on sales, the closest connections service may increase the connection strengths for that user.

The above processes may be applied to any or all types of communication messages 205. These may include emails, calendar events, text messages, phone calls, personal address books, social media chats or messages, documents, files (e.g., Quip files), marketing campaigns, web forms, or any manually logged information, such as emails, events, or activities. For example, a user may input, into the system 200, an indication of an activity that the user participated in with a target. These manually uploaded activities may be used along with automatically uploaded or stored information when calculating the closeness scores.

Not all communication messages 205 may be analyzed or scored. In some cases, the system 200 may implement a markoff process to sort through the communication messages 205 and identify the messages or activities with information relevant to the connections. The closest connections service may analyze the identified communication messages to calculate the closeness score, and may not analyze the marked off communication messages.

The system 200 may include any number of the above parameters when generating or updating the distributed graph 225. For example, the closest connections service may store an algorithm in memory. In some cases, the algorithm may be an example of a user, organization, or tenant configurable algorithm. The closest connections service may perform NLP on a set of communication messages 205 in order to extract metadata, and may use the extracted metadata as input to the algorithm. This extracted metadata may correspond to one or more of the above parameters, and based on the algorithm, the closest connections service may determine the connection strength value to indicate in the distributed graph 225.

The distributed graph 225 may be stored in a simple store 235, which may be an example of a database or disk. During future updates of the distributed graph 225, the simple store 235 may load or persist the distributed graph 225 at 230. The activity store 220 and simple store 235 may continue to store and update the distributed graph 225, so that the distributed graph 225 indicates connections strengths based on historical communication message data and pseudo-realtime activity streams.

At 240, the simple store 235 may send one or more indexes to graph services 245. For example, the graph services 245 may send a request to the closest connections service to retrieve connections for a specified target. In some cases, the simple store 235 may determine the users with the highest connection scores, and may return indexes associated with these users (e.g., user identifiers). The simple store 235 may determine the number of indexes to return based on an indication within the request, based on a configuration of the closest connections service, or based on a size of the organization. In other cases, the simple store 235 may send an index corresponding to a portion of the distributed graph 225, or the entire distributed graph 225. In some cases, in addition to the indexes from the simple store 235, the graph services 245 may receive optional live updates 255 from the message streaming platform 210.

The graph services 245 may store the received indexes—and, in some cases, the live updates—in a data store 250. The data store 250 may interact with one or more user devices 265 (i.e., clients) through a client interface 260. In some cases, the client interface 260 may be an example of a representational state transfer (REST) interface. The data store 250 may send the retrieved indexes to a user device 265 (e.g., user device 265-*a* or 265-*b*) for display in a user interface of the user device 265, or may use the indicated distributed graph 225 to determine connected users.

In one exemplary process, a user operating a user device 265, such as user device 265-*a*, may send a request to retrieve the closest connections corresponding to a first target. The request may be sent to the data store 250, which may check to identify if the requested information is stored in its memory. If the data store 250 determines the requested information is not stored and up to date, the data store 250 may send a request message to the simple store 235. The simple store 235 may store an up to date distributed graph 225 indicating the connection strengths between users and targets. The simple store 235 may send a number of indexes back to the data store indicating the user identifiers with the greatest connection strengths to the target. The data store 250 may pass this information to user device 265-*a*, and user device 265-*a* may display the user identifiers with the highest connection strengths between user and target.

The above process may allow a user or organization to track and weight internal activities (e.g., emails, calendar events, any manually logged activities, etc.). The organization may use the information related to these internal activities to determine connection strengths between users internal to the organization and contacts or targets outside of the organization (e.g., inter-organization relationships). In some cases, the organization may additionally determine connection strengths between different users within the organization (e.g., intra-organization relationships). The organization may synthesize this activity data using a graph, which may represent the existing connections and the strength of these connections. In this way, an organization may extract useful information from readily available information (e.g., activity information already stored by the organization).

In some cases, an organization may be an example of a tenant in a multi-tenant database system. Each tenant may have a tenant-specific graph indicating connections for users of that tenant. In some cases, these tenant-specific distributed graphs may be independent, without sharing of any contact or connection information between tenants. In other cases, two or more tenants may share information across graphs in order to improve the available communication information. The tenants may not share intra-organization information or specific communication messages or metadata. Instead, the tenants may share contact information (e.g., email signature information) to improve edge density and granularity of the graphs for the tenants involved. Whether tenants share information, as well as what information is shared, may be based on a tenant information sharing policy, which may be configurable on a tenant-by-tenant basis. In some cases, the tenants may share connection information, node information, or some combination of these to expand the dataset for generating the distributed graph 225.

In some systems 200, the closest connections service may use additional information with connection strength to determine the user to initiate communication. For example, the closest connections service may determine influences on a target, affiliations with a target, a level of expertise, knowledge of the target, or any other parameters that may affect the closeness of a user and a target. The closest connections service may additionally or alternatively generate more inferences from the distributed graph 225. For example, the service may determine which user should reply to certain communication messages, at what time a user should send a communication message, or any other inferences related to improving communication with a target.

In some cases, the target may not be a single user, but may be an organization. The distributed graph 225 may determine a likely candidate within this target organization, and may provide the information of the candidate in the target organization for a user to contact (e.g., information corresponding to a suggested recipient). In some cases, the closest connections service may still determine an intra-organization user to initiate the contact (e.g., a suggested sender) along with the suggested recipient within the target organization.

The closest connections service may allow users of an organization to view explicit values corresponding to implicitly established relationships between users and targets. The service efficiently utilizes messages and activities already stored in data stores to generate the distributed graph 225, and may limit latency by continually updating the distributed graph 225 based on communication message streams in pseudo-realtime.

Figure 3:
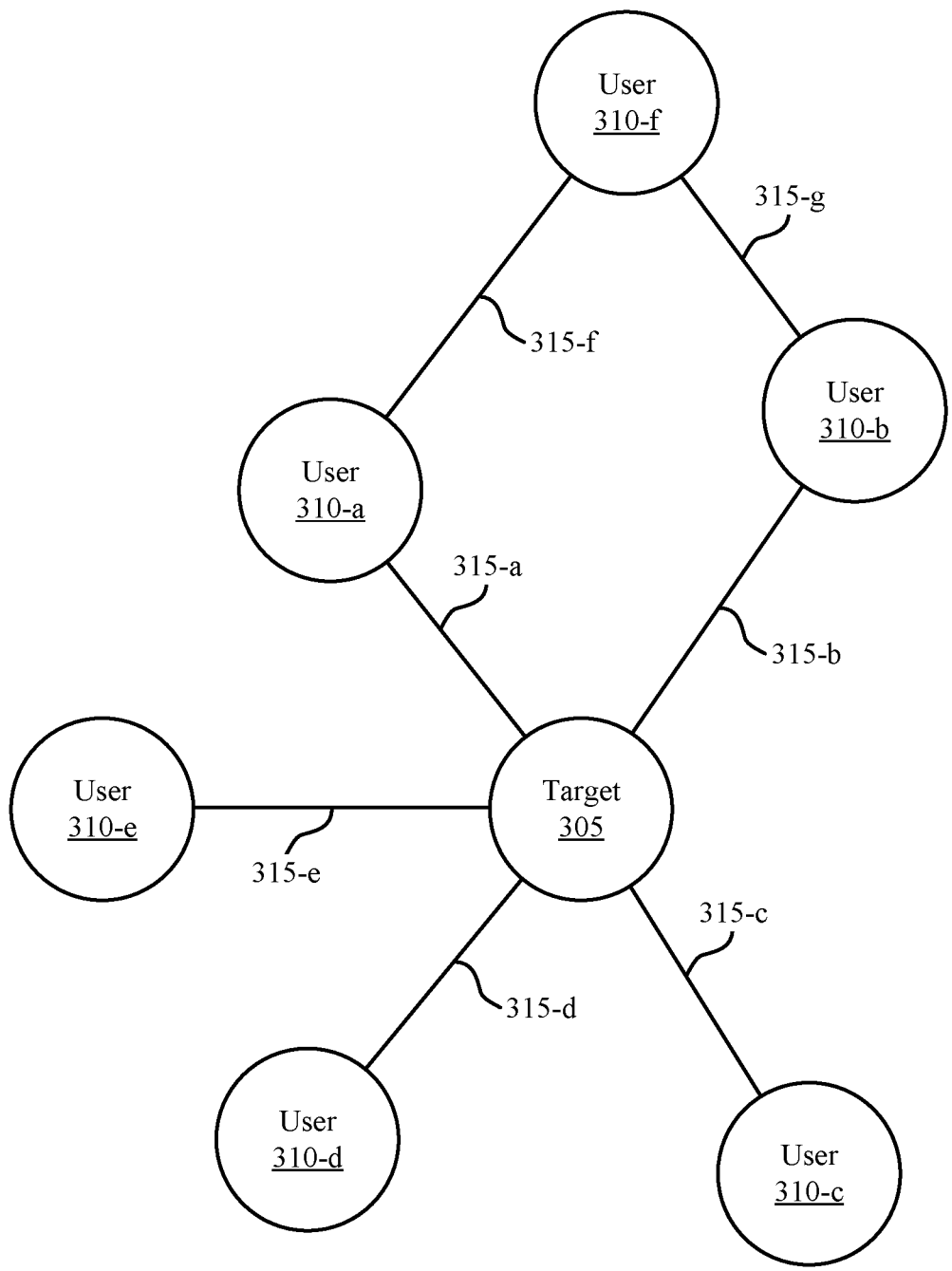
FIG. 3 illustrates an example of a distributed graph representation that supports calculating relationship strength using an activity-based distributed graph in accordance with aspects of the present disclosure.

FIG. 3 illustrates an example of a distributed graph representation 300 that supports calculating relationship strength using an activity-based distributed graph in accordance with aspects of the present disclosure. The distributed graph representation 300 may include nodes and edges. Each node may correspond to either a target 305 or a user 310. In some cases, targets 305 may function as users 310, or users 310 may function as targets 305. The edges connecting the nodes may represent connections 315 between the users 310 and/or targets 305. Each connection 315 may correspond to a connection score, representing the level of the relationship between two or more nodes (e.g., users 310, targets 305, or both). The distributed graph representation 300 may allow a user 310 or organization to track connections based on communication messages or activities.

When constructing or updating the distributed graph representation 300, a server may create or update nodes using user or target information. For example, the server may generate nodes using email information corresponding to the user 310 or target 305, such as an email address, a name, a signature (e.g., full name, title, email address, company name, company, phone number), or some combination of these or other user characteristics. In some cases, the server may employ entity resolution or deduplication to ensure that each target 305 and each user 310 corresponds to a single node in the graph. In some cases, users 310, targets 305, or both may be clustered within the graph based on shared attributes (e.g., users 310 that often work together). The server may additionally create or update edges based on communication messages. For example, the server may use metadata—such as a timestamp or sender/recipient information—to determine the connections 315.

The server may run algorithms on top of the graph to determine the closeness scores for the connections 315. In some cases, calculating a total closeness score for a connection 315 may involve aggregating two or more closeness scores. The algorithms may be based on any number of parameters, as described above with reference to FIG. 2. The server may further update the edges based on insights extracted from the communication messages (e.g., using NLP). These insights may include the style of the message, the role of the user 310 or target 305, one or more specific topics (e.g., pricing), or any other insights useful to determining connection strength. The distributed graph representation 300 may be indexed into a data store for querying by user devices.

The distributed graph representation 300 may use indirect edges to simulate a hypergraph. Simulating a hypergraph may allow the distributed graph to represent edges with more than two nodes. For example, two users 310 may meet with a same target 305 in a meeting. The server may generate an edge based on the meeting that connects both of these users 310 and the target 305. The distributed graph representation 300 allows for generation of this three-or-more-way connection between nodes.

The server may determine the connection strength between the nodes based on running the algorithms. In some cases, running the algorithms may aggregate connection values associated with multiple messages or activities, resulting in a net score. To normalize this net score across different sizes of organizations, the server may divide this net score by a total volume of communications or activities, or some similar normalizing technique. In some cases, the server may perform a log transformation on the net score or the normalized score. Additionally or alternatively, the server may separate the scores into portions (e.g., even portions, such as quintiles), and may assign an integer value according to each portion (e.g., from 1 to 5 if using quintiles).

In one exemplary implementation, the closeness scores may be normalized to values between 0 and 10, where 10 represents the strongest connection and 0 represents no connection. In such an implementation, a user 310 may request the closest connections for a target 305. As illustrated, users 310-*a*, 310-*b*, 310-*c*, 310-*d*, and 310-*e* may be directly connected to the target 305. Based on the algorithms and NLP analysis of the messages and activities, the distributed graph representation 300 may assign connection values to the connections 315. For example, connection 315-*a* may have a value of 7.1, connection 315-*b* a value of 3.5, connection 315-*c* a value of 4.0, connection 315-*d* a value of 5.2, and connection 315-*e* a value of 3.8. In a one vector closeness analysis, the server may determine based on the distributed graph representation 300 that user 310-*a* is the closest connection to the target 305. However, if user 310-*f* requests the closest connection using two vector closeness analysis, the distributed graph representation 300 may additionally take into account the closeness between users 310. For example, user 310-*f* may be connected to users 310-*a* and 310-*b*, where connection 315-*f* may have a value of 3.1 and connection 315-*g* may have a value of 8.8. In such cases, the server may aggregate the path of connections 315 from user 310-*f* to the target 305 to determine whether intermediate user 310-*a* or 310-*b* has the closest two vector connection. Depending on the aggregation process, the server may determine either user 310-*a* or 310-*b* based on the two vector process.

Figure 4A:
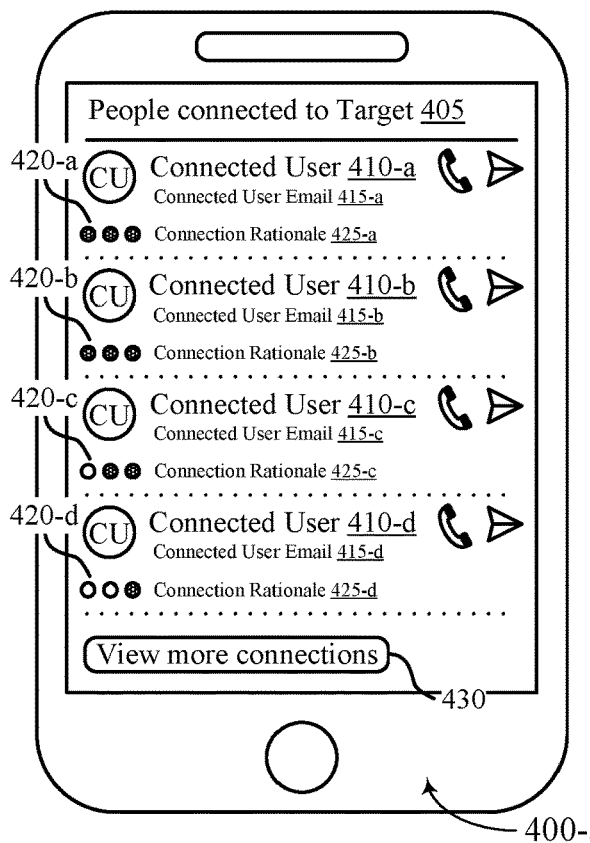
FIGS. 4A, 4B, and 4C illustrate examples of user interfaces that support calculating relationship strength using an activity-based distributed graph in accordance with aspects of the present disclosure.
Figure 4B:
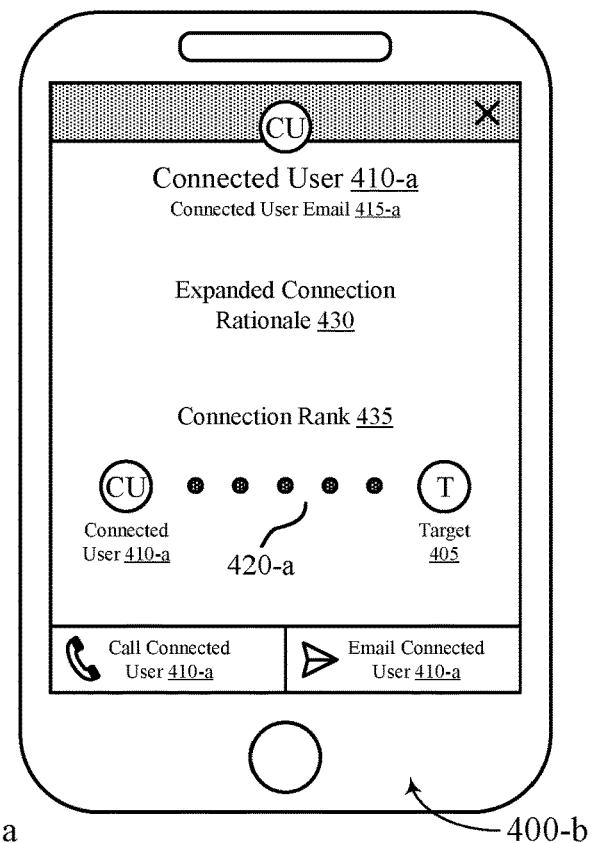
Figure 4C:
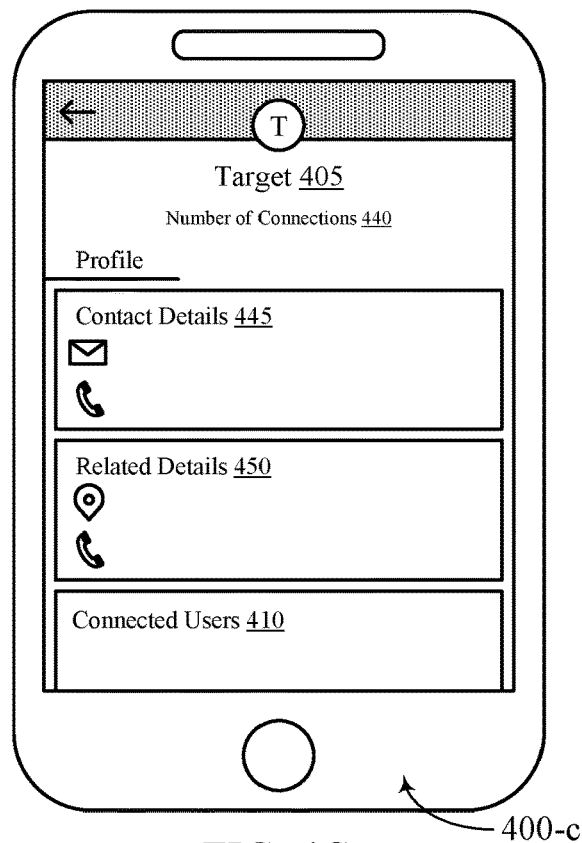

FIGS. 4A, 4B, and 4C illustrate examples of user interfaces 400 that support calculating relationship strength using activity-based distributed graphs in accordance with aspects of the present disclosure. For example, FIG. 4A shows a card view of the user interface 400-*a*. This card view may show one or more connected users 410 associated with a target 405. For example, a user operating the user device may input or select a target 405. This target may be a specific user identifier (e.g., a person's first or last name, email address, or any other user contact information) or an organization identifier (e.g., a name or code associated with the organization). A database server may determine the top ranked connections from the user's organization with this target 405. For example, the database server may rank the connected users 410—which may be examples of the users 310 described with reference to FIG. 3—from greatest closeness score to least closeness score with the target 405, and may retrieve a number of connected users 410 based on the ranking. For example, if configured to retrieve information for the top four connected users 410 (e.g., connected users 410-*a*, 410-*b*, 410-*c*, and 410-*d*), the database server may send an indication to the user device of the four connected users 410 with the greatest closeness scores to the target 405. In some cases, user interface 400-*a* may include a "view more connections" button 430. If a user selects (e.g., clicks on) this button, the user interface 400-*a* may display additional connected users 410 with corresponding information previously retrieved from the database server, or may send a new request specifying a larger number of connected users 410 to retrieve based on the distributed graph.

User interface 400-*a* may include information related to each selected connected user 410, as well as the connection between the connected user 410 and the target 405. For example, the user interface 400-*a* may display a connected user email 415, a calling option, an email option, a connected user avatar, an indication of the closeness score 420, an abbreviated plain language connection rationale 425, or any combination of these or other relevant display components. In some cases, user interface 400-*a* may display the connected users 410 in descending order by closeness score. For example, user interface 400-*a* may display connected user 410-*a* with the highest closeness score (e.g., indicated by the indication of the closeness score 420-*a*, which in this case may be an example of a three dot ranking system) at the top of the card view. Connected user 410-*a* may be associated with a connected user email 415-*a*, and the connection rationale 425 may state that connected user 410-*a* has the highest connection, as well as why the connected user 410-*a* has the highest connection.

In descending order from connected user 410-*a*, user interface 400-*a* may display connected user 410-*b* with corresponding connected user email 415-*b*, indication of closeness score 420-*b*, and connection rationale 425-*b*; connected user 410-*c* with corresponding connected user email 415-*c*, indication of closeness score 420-*c*, and connection rationale 425-*c*; and connected user 410-*d* with corresponding connected user email 415-*d*, indication of closeness score 420-*d*, and connection rationale 425-*d*. In some cases, user interface 400-*a* may display a subset of these parameters, or may display additional parameters.

As illustrated, the user interface 400-*a* may display the indications of the closeness scores 420 using a three dot ranking system. This may illustrate one exemplary implementation for visualizing the closeness scores associated with connected users 410 and the target 405. However, many other possible display implementations for this indicator may be used by user interface 400-*a*. As shown, the closeness scores may be sorted by rank (e.g., using an absolute closeness score, an average closeness score, or a range of closeness scores), and different percentages of the list may correspond to the different numbers of indicated dots. In some cases these numbers may be configurable by a user or an organization. In an exemplary case, three dots may correspond to the top ranked 85-100% of connections (i.e., a "high" connectivity), two dots may indicate 60-85% (i.e., an "average" connectivity), one dot may indicate 30-60% (i.e., a "low" connectivity), and zero dots may indicate 0-30% (i.e., "no" or "minimal" connectivity). These ranges are given as examples, and it should be understood that any other percentage ranges may be used to determine the indicators.

The connection rationale 425 may give a brief, plain language description explaining the ranking for the connected user 410. In some cases, the database server or user device may utilize a machine-learned model to generate the plaintext rationale on a user-by-user basis. In other cases, the brief connection rationale 425 may be boilerplate language based on the ranking of the connected user 410. For example, users with "high" connectivity to the target 405 may display the text "Higher volume of meetings and email exchange" as the connection rationale 425. In some cases, the brief connection rationale 425 for each connected user 410 may include a "view more rationale" button. A user selecting this button may trigger the user device to display further information on the corresponding connected user 410 in a rationale modal, as described below.

FIG. 4B and user interface 400-b show an example rationale modal for a connected user 410-a. The rationale modal may include a user avatar, an indicator of the connected user 410-a (e.g., a name, title, etc.), the connected user email address 415-a, an expanded connection rationale 430, a connection rank 435 (e.g., "Highest Connection," "High Connection," "Average Connection," "Low Connection," etc.), an indication of the closeness score 420-a, a button for voice calling functionality, a button for email functionality, a button to close the rationale modal, or any combination of these or other modal components. In some cases, the expanded connection rationale 430 may be an example of an extended boilerplate plain language description corresponding to the rank or closeness score of the connected user 410-a. In other cases, the database server or user device may implement a machine learned model to determine information specific to the connected user 410-a, and may display some or all of this information in the expanded connection rationale 430. As above, the indication of the closeness score 420-a may be displayed in any number of formats. As illustrated, the indicator may use a five dot ranking system, but alternatively any other static visualization of the closeness score may be used.

FIG. 4C shows a profile view of the user interface 400-c associated with a target 405. In some cases, the profile view may be an alternative display to the card view described above. In other cases, the profile view may incorporate one or more aspects of the card view. For example, the profile view may include connected users 410 as described above, along with corresponding connected user information. In addition to this connected users 410 display, the profile view may include information associated with the target 405. For example, user interface 400-c may display a target avatar, an indication of the target 405 (e.g., name, title, etc.), a number of connections 440 between the target 405 and connected users 410, contact details 445 (e.g., email address, phone number, etc.), related details 450 (e.g., users, locations, or contact information related to the target 405), or any combination of these or other components corresponding to the target 405.

Figure 5:
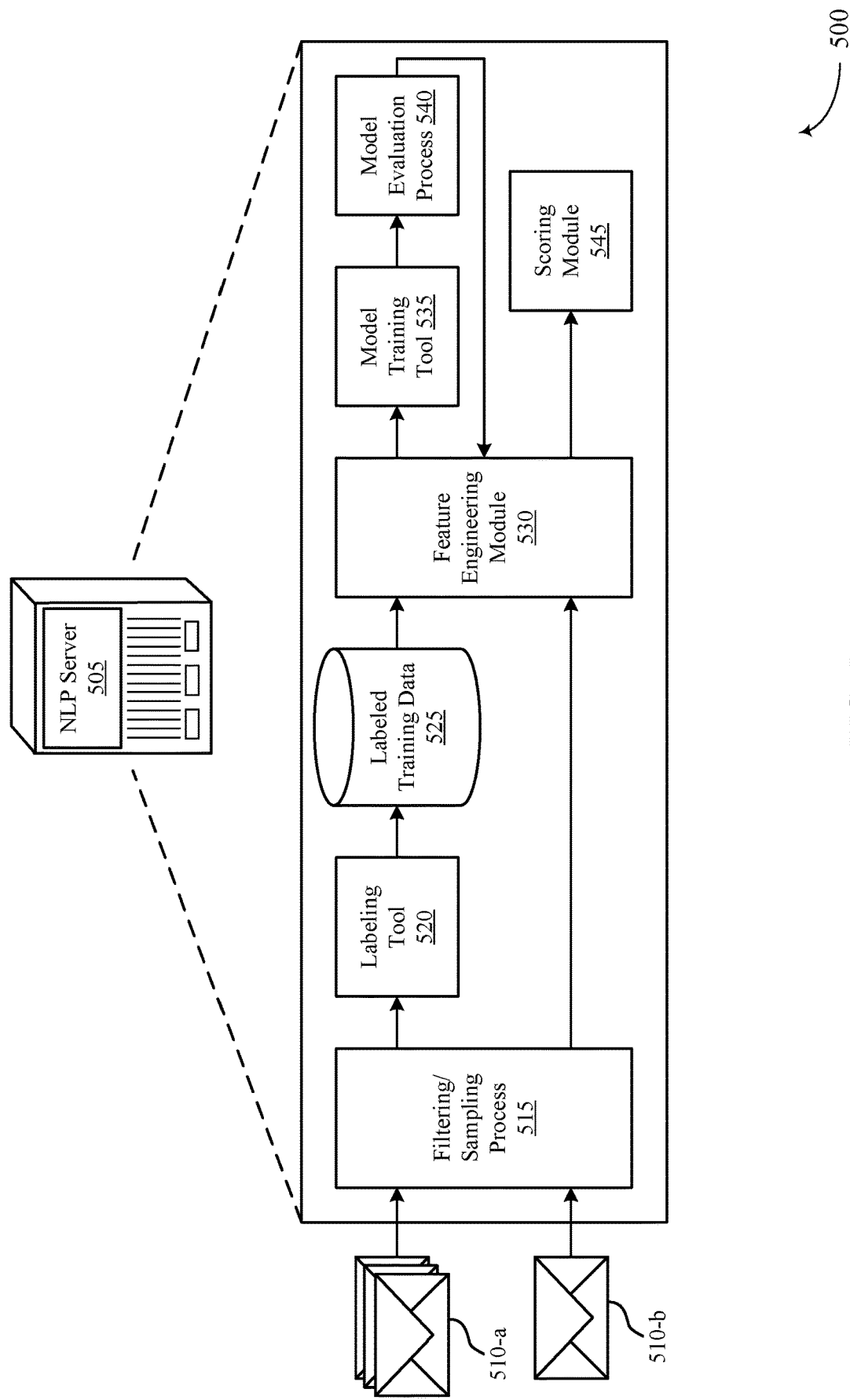
FIG. 5 illustrates an exemplary natural language processing (NLP) procedure that supports calculating relationship strength using an activity-based distributed graph in accordance with aspects of the present disclosure.

FIG. 5 illustrates an exemplary NLP procedure 500 that supports calculating relationship strength using an activity-based distributed graph in accordance with aspects of the present disclosure. A database server, such as an NLP server 505, may utilize the exemplary NLP procedure 500 to analyze text within a communication message. This NLP server 505 may be an example of a database server or server cluster as described above. The NLP server 505 may receive communication messages 510 as input and may perform multiple procedures in order to construct a model for determining insights and extracting metadata from a communication message 510.

In order to train the model, the NLP server 505 may process sets of historical data or training data, such as communication messages 510-a. The NLP server 505 may perform a set of data services, including data parsing, validation, filtering, extraction, sampling, labeling, or any combination of these services, to analyze the communications. Once the NLP server 505 determines a model, the NLP server 505 may utilize the model to analyze communication messages 510 in realtime or pseudo-realtime, and may or may not continue to update the model based on the incoming messages and user feedback.

Each communication message of the training set of communication messages 510-a may pass to a filtering/sampling process 515. This filtering/sampling process 515 may filter out communication messages 510 based on consent, whether the message is classified as internal or external, based on language or size of the message, based on a volume of messages associated with a user of the message, or based on any other filtering criteria. In some cases, the filtering/sampling process 515 may include data parsing using activity schema such as a body extractor, reply chain remover, confidentiality remover, conference call parser, or signature parser. These processes may reduce the amount of unimportant noise in a communication message 510 (e.g., an email) so that the NLP server 505 may more accurately determine important characteristics of the message. The filtering/sampling process 515 may additionally or alternatively perform data validation, where the NLP server 505 may use notebooks to check fields within the communication messages 510 and efficiently validate these communication messages 510 at scale. Data validation may identify corrupted messages or messages missing vital information for analysis, and may remove these messages without further analysis.

The NLP server 505 may send the communication messages 510 to a labeling tool 520. The labeling tool 520 may label each communication message 510 with any number of labels based on an NLP procedure. These labels may correspond to insights or moments identified within the message.

In some cases, executive users may manually label data in the labeling tool 520. However, such a system may be very inefficient when processing large sets of communications. Instead, the labeling tool 520 may utilize multiple techniques for efficiently automating the labeling process. For example, the labeling tool 520 may implement features such as word-to-vector to perform these processes. The labeling tool 520 may implement a high-recall filter to reduce the number of communication messages 510 while focusing on a subset of the messages more likely to include certain insights or moments. The high-recall filter may include building a relationship graph for the messages and implementing a word-to-vector technique. Word-to-vector may be an example of a neural network that analyzes text from the messages and generates a high-dimensional vector space including word vectors from the text. Word-to-vector may determine symbols, words, or phrases that are commonly found in proximity to other symbols, words, or phrases in the analyzed communication messages 510, and may associate these proximate entities in the vector space. In some cases, word-to-vector may search for unigrams (e.g., single symbols or words), n-grams (e.g., n-word phrases), or a combination of these, for example, based on a modeling configuration.

To improve the performance of a feature like word-to-vector, the labeling tool 520 may perform extraction, normalization, anonymization, or some combination of these processes on the communication messages 510. For extraction, the labeling tool 520 may extract just a portion of the communication messages 510 to analyze. For example, in the case of an email, the labeling tool 520 may perform word-to-vector analysis on the body of the email, but not on the introduction, signature, confidentiality notice, reply chain, or some combination of these portions. Analyzing these other portions may result in associating words or phrases that are not significant in determining how to respond to a message. Normalization and anonymization may involve replacing certain symbols, words, or phrases in a message with placeholders. For example, a normalizer may replace specific prices or dates with the broader placeholders "PRICE" or "DATE." This may help with properly associating word vectors in the messages. Similarly, anonymization may replace specific names, phone numbers, addresses, etc. with generic placeholders, both for vectorization and confidentiality purposes. In some cases, the labeling tool 520 may utilize a technique such as word-to-vector to identify entities, such as metadata entities, within the message, and extract one or more of these entities. The labeling tool 520 may associate the extracted entities with the corresponding communication message 510 for further processing or analysis.

Labeled communication messages 510 may be stored in a labeled training data 525 database or disk. This labeled training data 525 may be used by a feature engineering module 530 to generate a model for the binary classification process. Feature engineering module 530 may implement classifying techniques utilizing text processing, such as latent Dirichlet allocation (LDA), term frequency-inverse document frequency (TF-IDF) information retrieval, or any other text processing techniques. Exemplary additional text processing techniques may include Deep Learning techniques, such as a recurrent neural networks (RNNs) with long short-term memory (LSTM) units, or any other Deep Learning techniques for NLP.

For example, in LDA, the feature engineering module 530 may group the communication messages 510 into classifications. LDA may take a communication message 510 as input, and may calculate a probability distribution for the message across the classifications. Scoring a message using LDA may result in a distribution of classifications, although these classifications may not be tied to any specific insight (e.g., a "pricing mention"). As with word-to-vector, the performance of LDA may improve if just a portion (e.g., the body) of a message is analyzed. In some cases, a base model may be generated (e.g., using manual labeling) before generating a high-recall filter or performing word-to-vector or LDA analysis on a message. These further processes may improve the model or expand the model to a superset of communication messages 510.

In some cases, the feature engineering module 530 may implement word inventing to improve the machine-learned process. For example, the feature engineering module 530 may determine additional symbols, words, or phrases not included in the labeled training data 525 that relate to symbols, words, or phrases that are included in this training data set. The feature engineering module 530 may train a model to search for these additional symbols, words, or phrases, despite not being included in the training data.

The classifications and symbols, words, and phrases determined by the feature engineering module 530 may be passed to a model training tool 535. The model training tool 535 may use this information to update the NLP and binary classification models. The NLP server 505 may send these updated models to a model evaluation process 540, which may test the updated models against a set of test messages. The model evaluation process 540 may further refine the models based on running one or more tests, and may return these updated models to the feature engineering module 530. In some cases, the model evaluation process 540 may further include receiving user feedback, and updating the models based on the feedback. The updated models may be used on future messages sent to the feature engineering module 530—or, in some cases, the filtering/sampling process 515 or the labeling tool 520—to analyze the messages.

For example, a user device may send the NLP server 505 a new communication message 510-*b* in pseudo-realtime as part of a communication intake stream. The NLP server 505 may send the new communication message 510-*b* through the filtering/sampling process 515 (e.g., which may include graph or word-to-vector analysis), through the feature engineering module 530 (e.g., which may classify the message using text processing or LDA), and to a scoring module 545. This message flow may be referred to as the scoring pipeline. The scoring module 545 may calculate a score based on the accuracy or a confidence level associated with the classification or entity extraction of the new communication message 510-*b*. In this way, the NLP server 505 may not just extract entities and classify a communication message 510, but may additionally determine which metadata or classifications are more likely to be accurate or helpful to a user. The classification and extracted entities may be used to determine connection strength and closeness scores for users associated with the communication messages 510.

Figure 6:
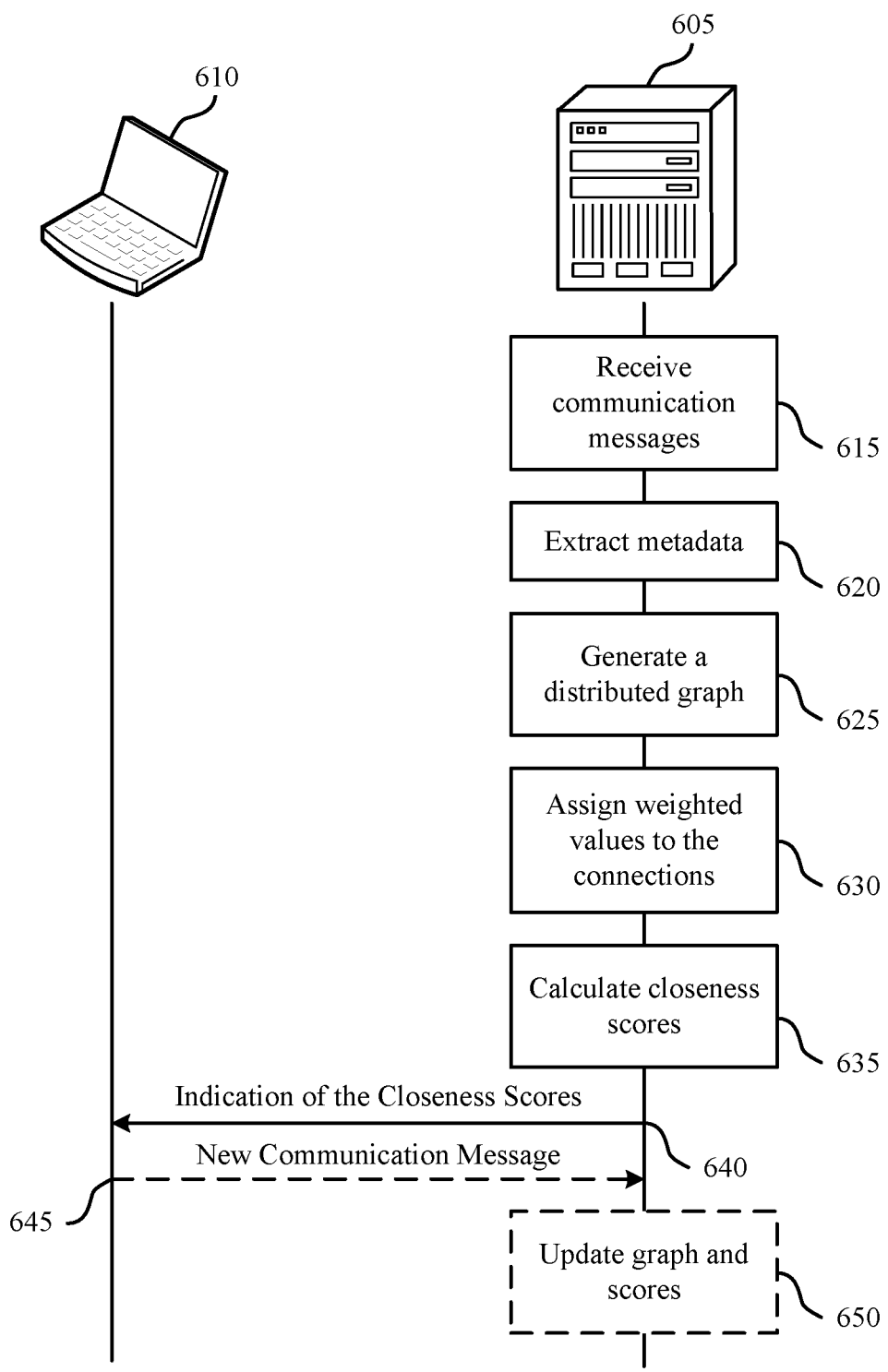
FIG. 6 illustrates an example of a process flow that supports calculating relationship strength using an activity-based distributed graph in accordance with aspects of the present disclosure.

FIG. 6 illustrates an example of a process flow 600 that supports calculating relationship strength using an activity-based distributed graph in accordance with aspects of the present disclosure. The process flow 600 may include a database server 605 and, in some cases, a user device 610. The database server 605 may be an example of an NLP server 505 as described with reference to FIG. 5, or may be a component of a cloud platform 115, data center 120, or system 200, as described with reference to FIGS. 1 and 2. The user device 610 may be an example of a cloud client 105 or a device hosting a user interface 400 as described above, for example, with reference to FIGS. 1 and 4. The database server 605 may process communication data to determine one or more closeness scores for sets of users or corresponding user identifiers.

At 615, the database server 605 may receive communication messages associated with a first user identifier and a second user identifier. These communication messages may be examples of emails, calendar events, service tickets, text messages, voice calls, social media messages, documents, or any other messages associated with two or more users (e.g., where one of the users may be referred to as the target or target user). In some cases, the communication messages may be activities or tasks performed by a first user identifier and associated with a second user identifier. A user device, such as the user device 610, may send the communication messages to the database server 605. For example, the user device 610 may correspond to a first user or first user identifier, and may transmit the communications to a second user or user identifier. The second user may be associated with the database server 605, and the database server 605 may receive the communication messages in addition to the second user based on the association. Alternatively, the first user may be associated with the database server 605, and may receive communications from a user device of the second user. The user device 610 of the first user may forward these communications to the database server 605 at 615. In other cases, the database server 605 may receive batches of communication messages from storage (e.g., stored in memory in a database or on a disk).

At 620, the database server 605 may extract metadata from the communication messages. For example, the database server 605 may perform NLP analysis on the text of the communication messages. For each communication message, the extracted metadata may include a timestamp associated with the message, user identifiers (e.g., the first user identifier, the second user identifier, or additional user identifiers) associated with the message, or businesses or organizations mentioned in the message. Additionally or alternatively, the database server 605 may use the NLP to determine an intent of the message, a formality level of the message, an influence level of one or more users associated with the message, or any other metrics or patterns for the message that may help define the relationship between the first user identifier and the second user identifier. The NLP procedure may include data parsing, validation, filtering, extraction, normalization, anonymization, sampling, labeling, word inventing, or any combination of these or other NLP techniques.

At 625, the database server 605 may generate a distributed graph representation of one or more connections between the first user identifier and the second user identifier. The distributed graph may additionally include many other user identifiers, along with connections for these user identifiers as well. In the graph representation, these connections may be represented by direct or indirect edges between users (e.g., where the users are represented by nodes). In some cases (e.g., in a multi-tenant database system), the database server 605 may store multiple tenant-specific distributed graphs in memory. These tenant-specific graphs may or may not share connection information according to tenant information sharing policies. The distributed graph representation may indicate an edge direction between users, a timestamp associated with messages, a sender or sender information associated with messages, a recipient or recipient information associated with messages, event types associated with messages, text associated with messages, or some combination of these or other indications.

Generating the distributed graph may involve multiple techniques, including entity resolution, graph enhancement, or any combination of these or other graph generation techniques. Entity resolution may involve the database server 605 identifying any nodes that correspond to a same contact (e.g., if a user or target has multiple different email addresses), and merging these nodes to form a single node corresponding to the contact. Graph enhancement may involve the database server 605 performing one or more additional operations. These additional operations may include inferring whether a contact is within or outside of a user organization, identifying emails to avoid creating nodes for (e.g., based on a non-human email address, a suspicious name or email address, a shared email account, etc.), condensing user to user edge communication to reduce the size of the distributed graph, or any combination of these or similar graph enhancement operations.

At 630, the database server 605 may assign a weighted value to each of the connections. For example, the database server 605 may analyze the extracted metadata, and determine the weighted values based on the analysis. The weighted values may be based on when a communication occurred, whether the communication message represents a calendar invite or an email, how many users are associated with the communication, or any combination of these or other weighting criteria.

At 635, the database server 605 may calculate a closeness score for the first user identifier and the second user identifier. Calculating the closeness score may involve aggregating the assigned weighted values for the connections between the first and second user identifiers. In some cases, calculating the closeness score may additionally involve normalizing the closeness score according to an organization size, a total number of communication messages in the organization, a transmission or reception rate of communication messages associated with the organization, or some combination of these normalizing factors.

At 640, the database server 605 may transmit an indication of the closeness score. In some cases, this transmission may be in response to a score request message from the user device 610.

At 645, the database server 605 may receive a new communication message associated with the first and second user identifiers. The new communication message may be part of a realtime or pseudo-realtime communication stream. At 650, the database server 605 may extract metadata from the new communication message, analyze the new metadata, and update the distributed graph based on the new information. Accordingly, the database server 605 may additionally update the weighted values and closeness scores based on the analysis of the new communication or the updated graph. In some cases, the database server 605 may transmit an updated closeness score based on the realtime or pseudo-realtime updates.

Figure 7:
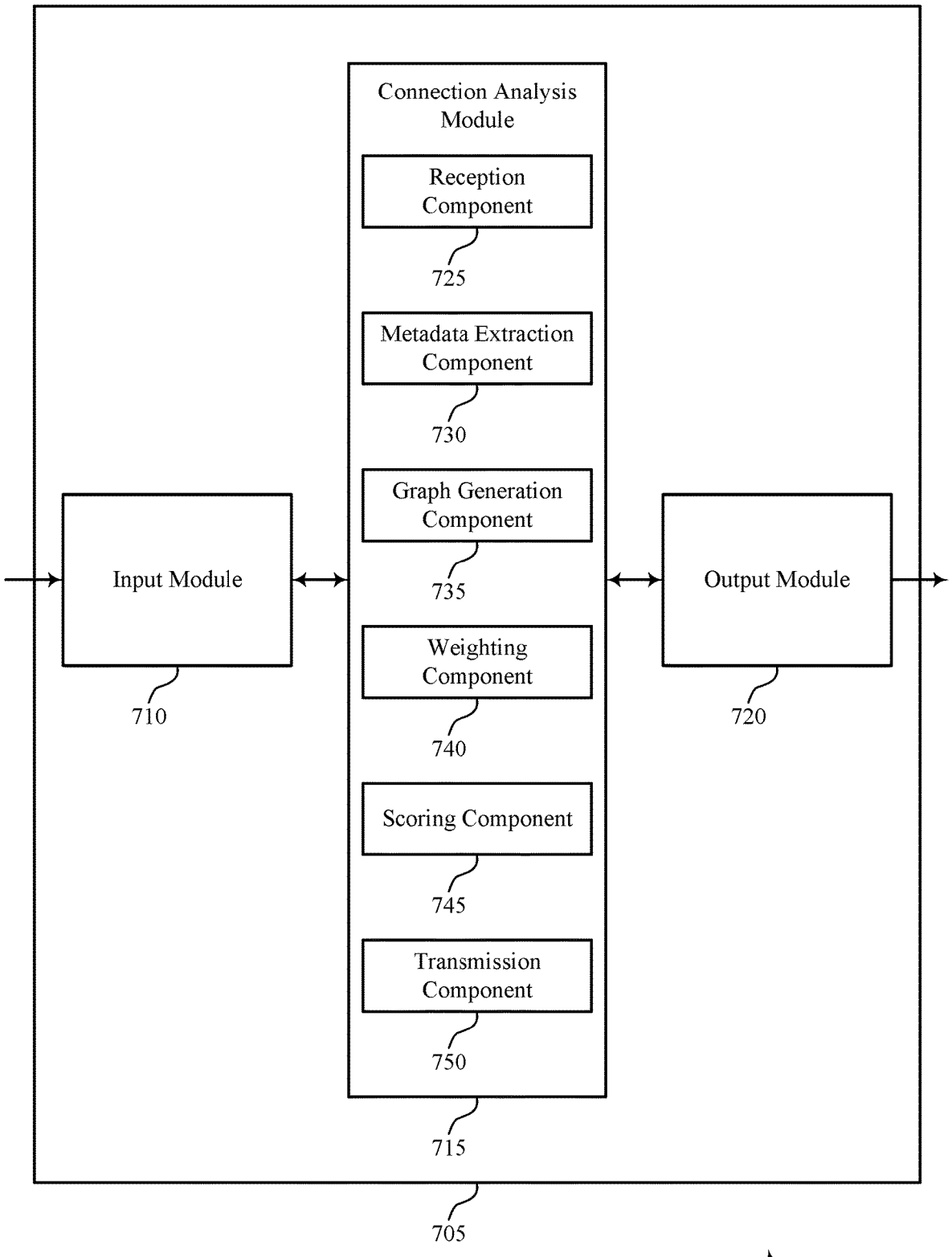
FIGS. 7 and 8 show block diagrams of a device that supports calculating relationship strength using an activity-based distributed graph in accordance with aspects of the present disclosure.

FIG. 7 shows a block diagram 700 of an apparatus 705 that supports calculating relationship strength using an activity-based distributed graph in accordance with aspects of the present disclosure. Apparatus 705 may include input module 710, connection analysis module 715, and output module 720. Apparatus 705 may also include a processor. Each of these components may be in communication with one another (e.g., via one or more buses). In some cases, apparatus 705 may be an example of a user terminal, a database server, or a system containing multiple computing devices.

Connection analysis module 715 may be an example of aspects of the connection analysis module 915 described with reference to FIG. 9. Connection analysis module 715 may also include reception component 725, metadata extraction component 730, graph generation component 735, weighting component 740, scoring component 745, and transmission component 750.

Connection analysis module 715 and/or at least some of its various sub-components may be implemented in hardware, software executed by a processor, firmware, or any combination thereof. If implemented in software executed by a processor, the functions of the connection analysis module 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The connection analysis module 715 and/or at least some of its various sub-components may be physically located at various positions, including being distributed such that portions of functions are implemented at different physical locations by one or more physical devices. In some examples, connection analysis module 715 and/or at least some of its various sub-components may be a separate and distinct component in accordance with various aspects of the present disclosure. In other examples, connection analysis module 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Reception component 725 may receive a set of communication messages associated with a first user identifier and a second user identifier. In some cases, the set of communication messages includes emails, calendar events, service tickets, short message service (SMS) text messages, voice calls, social media messages, documents, activities, or a combination thereof.

Metadata extraction component 730 may extract metadata from the set of communication messages, where the metadata includes at least a timestamp associated with each of the set of communication messages.

Graph generation component 735 may generate a distributed graph representation of one or more connections between the first user identifier and the second user identifier based on the extracted metadata. In some cases, the distributed graph representation is a first tenant-specific distributed graph representation corresponding to a first tenant of a multi-tenant database system. In these cases, graph generation component 735 may generate a second tenant-specific distributed graph representation corresponding to a second tenant of the multi-tenant database system. In some cases, graph generation component 735 may additionally update the first tenant-specific distributed graph representation with connection information of the second tenant-specific distributed graph representation according to a tenant information sharing policy. In some cases, the distributed graph representation indicates an edge direction between user identifiers, the timestamp associated with each of the set of communication messages, a sender and corresponding sender information associated with each of the set of communication messages, a recipient and corresponding recipient information associated with each of the set of communication messages, an event type associated a communication message, one or more portions of text associated with the communication message, or a combination thereof.

Weighting component 740 may assign a weighted value to each of the one or more connections, where the weighted value is based on an analysis of the extracted metadata. Scoring component 745 may calculate a closeness score for the first user identifier and the second user identifier based on an aggregation of the assigned weighted values. Transmission component 750 may transmit an indication of the closeness score.

Figure 8:
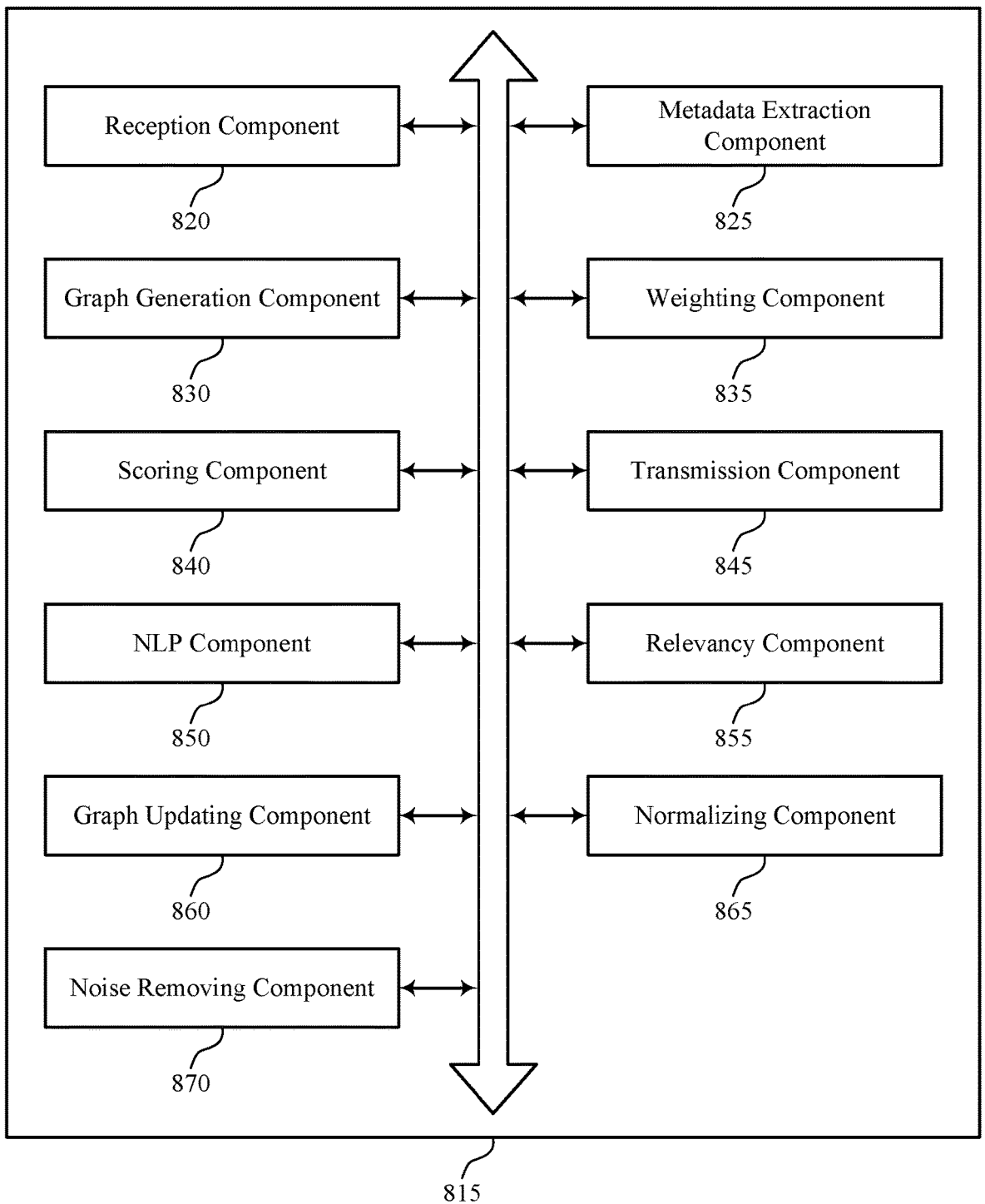

FIG. 8 shows a block diagram 800 of a connection analysis module 815 that supports calculating relationship strength using an activity-based distributed graph in accordance with aspects of the present disclosure. The connection analysis module 815 may be an example of aspects of a connection analysis module 715 or 915 described with reference to FIGS. 7 and 9. The connection analysis module 815 may include reception component 820, metadata extraction component 825, graph generation component 830, weighting component 835, scoring component 840, transmission component 845, NLP component 850, relevancy component 855, graph updating component 860, normalizing component 865, and noise removing component 870. Each of these modules may communicate, directly or indirectly, with one another (e.g., via one or more buses).

Reception component 820 may receive a set of communication messages associated with a first user identifier and a second user identifier. In some cases, the set of communication messages includes emails, calendar events, service tickets, SMS text messages, voice calls, social media messages, documents, activities, or a combination thereof.

Metadata extraction component 825 may extract metadata from the set of communication messages, where the metadata includes at least a timestamp associated with each of the set of communication messages.

Graph generation component 830 may generate a distributed graph representation of one or more connections between the first user identifier and the second user identifier based on the extracted metadata. In some cases, the distributed graph representation is a first tenant-specific distributed graph representation corresponding to a first tenant of a multi-tenant database system. In these cases, graph generation component 830 may generate a second tenant-specific distributed graph representation corresponding to a second tenant of the multi-tenant database system. In some cases, graph generation component 830 may update the first tenant-specific distributed graph representation with connection information of the second tenant-specific distributed graph representation according to a tenant information sharing policy. In some cases, the distributed graph representation indicates an edge direction between user identifiers, the timestamp associated with each of the set of communication messages, a sender and corresponding sender information associated with each of the set of communication messages, a recipient and corresponding recipient information associated with each of the set of communication messages, an event type associated a communication message, one or more portions of text associated with the communication message, or a combination thereof.

Weighting component 835 may assign a weighted value to each of the one or more connections, where the weighted value is based on an analysis of the extracted metadata. Scoring component 840 may calculate a closeness score for the first user identifier and the second user identifier based on an aggregation of the assigned weighted values. Transmission component 845 may transmit an indication of the closeness score.

NLP component 850 may perform an NLP analysis of text of the set of communication messages, where extracting the metadata is based on the NLP analysis. In some cases, NLP component 850 may analyze a test dataset of communication messages to determine a list of words to search for in the text, perform a word inventing procedure to determine an additional list of words to search for in the text, where the additional list of words is not present in the test dataset of communication messages, and search the text of the set of communication messages for any words included in the list of words or the additional list of words.

Relevancy component 855 may identify a relevancy value for each communication message of the set of communication messages based on the NLP analysis or a characteristic of the communication message, and, in some cases, may remove a communication message from the set of communication messages if an associated relevancy value is below a relevancy threshold.

Graph updating component 860 may receive a new communication message associated with the first user identifier and the second user identifier, extract new metadata from the new communication message, and update the distributed graph representation based on the extracted new metadata.

Normalizing component 865 may normalize the closeness score according to a size of an organization, a total number of communication messages associated with the organization, or a combination thereof.

Noise removing component 870 may identify a third user identifier and remove one or more communication messages associated with the third user identifier from the set of communication messages based on receiving a volume of communication messages associated with the third user identifier greater than a threshold volume of communication messages.

Figure 9:
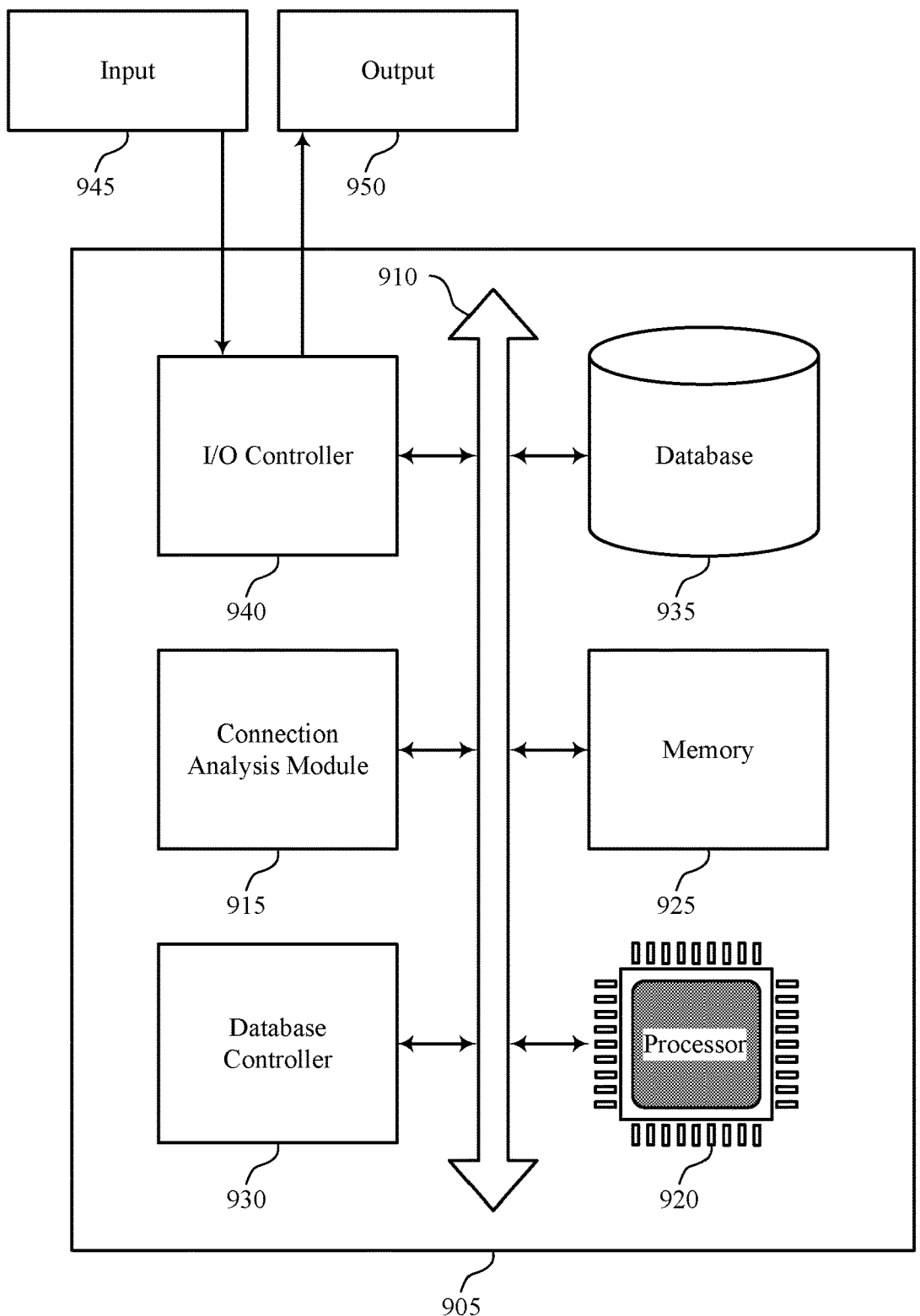
FIG. 9 illustrates a block diagram of a system including a database server that supports calculating relationship strength using an activity-based distributed graph in accordance with aspects of the present disclosure.

FIG. 9 shows a diagram of a system 900 including a device 905 that supports calculating relationship strength using an activity-based distributed graph in accordance with aspects of the present disclosure. Device 905 may be an example of or include the components of database server as described above, e.g., with reference to FIGS. 1, 2, 5, and 6. Device 905 may include components for bi-directional data communications including components for transmitting and receiving communications, including connection analysis module 915, processor 920, memory 925, database controller 930, database 935, and I/O controller 940. These components may be in electronic communication via one or more buses (e.g., bus 910).

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting calculating relationship strength using an activity-based distributed graph).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Database controller 930 may manage data storage and processing in database 935. In some cases, a user may interact with database controller 930. In other cases, database controller 930 may operate automatically without user interaction. Database 935 may be an example of a single database, a distributed database, multiple distributed databases, or an emergency backup database.

I/O controller 940 may manage input and output signals for device 905. I/O controller 940 may also manage peripherals not integrated into device 905. In some cases, I/O controller 940 may represent a physical connection or port to an external peripheral. In some cases, I/O controller 940 may utilize an operating system such as iOS®, ANDROID®, MS-DOS®, MS-WINDOWS®, OS/2®, UNIX®, LINUX®, or another known operating system. In other cases, I/O controller 940 may represent or interact with a modem, a keyboard, a mouse, a touchscreen, or a similar device. In some cases, I/O controller 940 may be implemented as part of a processor. In some cases, a user may interact with device 905 via I/O controller 940 or via hardware components controlled by I/O controller 940.

Figure 10:
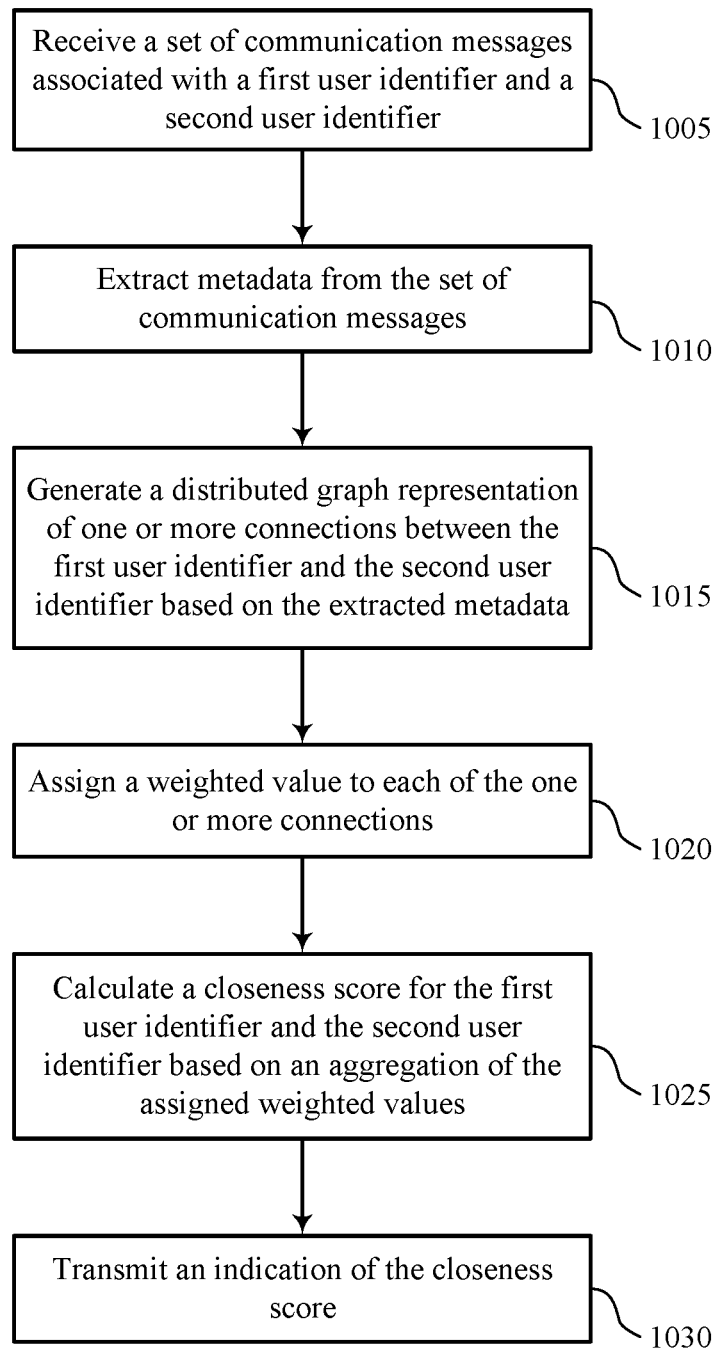
FIGS. 10 through 12 illustrate methods for calculating relationship strength using an activity-based distributed graph in accordance with aspects of the present disclosure.

FIG. 10 shows a flowchart illustrating a method 1000 for calculating relationship strength using an activity-based distributed graph in accordance with aspects of the present disclosure. The operations of method 1000 may be implemented by a database server or its components as described herein. For example, the operations of method 1000 may be performed by a connection analysis module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1005 the database server may receive multiple communication messages associated with a first user identifier and a second user identifier. The operations of 1005 may be performed according to the methods described herein. In certain examples, aspects of the operations of 1005 may be performed by a reception component as described with reference to FIGS. 7 through 9.

At 1010 the database server may extract metadata from the communication messages, where the metadata includes at least a timestamp associated with each of the communication messages. The operations of 1010 may be performed according to the methods described herein. In certain examples, aspects of the operations of 1010 may be performed by a metadata extraction component as described with reference to FIGS. 7 through 9.

At 1015 the database server may generate a distributed graph representation of one or more connections between the first user identifier and the second user identifier based on the extracted metadata. The operations of 1015 may be performed according to the methods described herein. In certain examples, aspects of the operations of 1015 may be performed by a graph generation component as described with reference to FIGS. 7 through 9.

At 1020 the database server may assign a weighted value to each of the one or more connections, where the weighted value is based on an analysis of the extracted metadata. The operations of 1020 may be performed according to the methods described herein. In certain examples, aspects of the operations of 1020 may be performed by a weighting component as described with reference to FIGS. 7 through 9.

At 1025 the database server may calculate a closeness score for the first user identifier and the second user identifier based on an aggregation of the assigned weighted values. The operations of 1025 may be performed according to the methods described herein. In certain examples, aspects of the operations of 1025 may be performed by a scoring component as described with reference to FIGS. 7 through 9.

At 1030 the database server may transmit an indication of the closeness score. The operations of 1030 may be performed according to the methods described herein. In certain examples, aspects of the operations of 1030 may be performed by a transmission component as described with reference to FIGS. 7 through 9.

Figure 11:
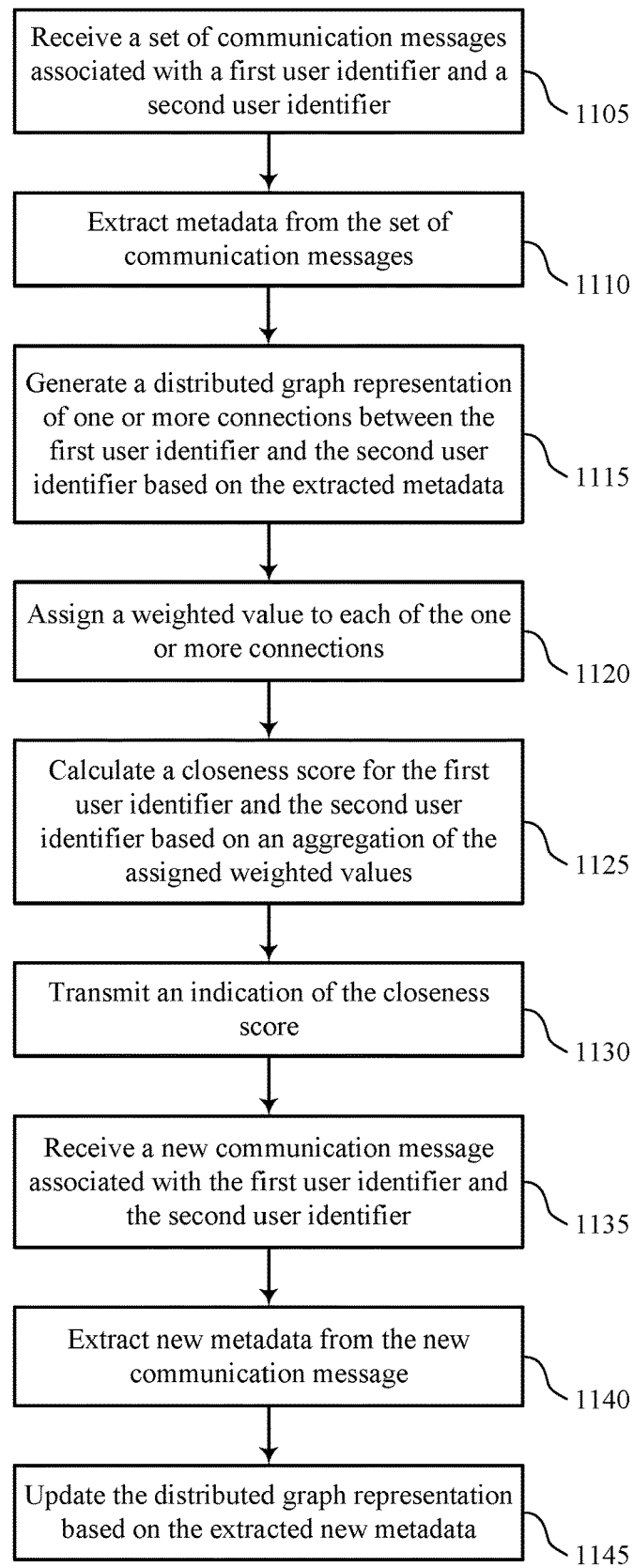

FIG. 11 shows a flowchart illustrating a method 1100 for calculating relationship strength using an activity-based distributed graph in accordance with aspects of the present disclosure. The operations of method 1100 may be implemented by a database server or its components as described herein. For example, the operations of method 1100 may be performed by a connection analysis module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1105 the database server may receive communication messages associated with a first user identifier and a second user identifier. The operations of 1105 may be performed according to the methods described herein. In certain examples, aspects of the operations of 1105 may be performed by a reception component as described with reference to FIGS. 7 through 9.

At 1110 the database server may extract metadata from the communication messages, where the metadata includes at least a timestamp associated with each of the communication messages. The operations of 1110 may be performed according to the methods described herein. In certain examples, aspects of the operations of 1110 may be performed by a metadata extraction component as described with reference to FIGS. 7 through 9.

At 1115 the database server may generate a distributed graph representation of one or more connections between the first user identifier and the second user identifier based on the extracted metadata. The operations of 1115 may be performed according to the methods described herein. In certain examples, aspects of the operations of 1115 may be performed by a graph generation component as described with reference to FIGS. 7 through 9.

At 1120 the database server may assign a weighted value to each of the one or more connections, where the weighted value is based on an analysis of the extracted metadata. The operations of 1120 may be performed according to the methods described herein. In certain examples, aspects of the operations of 1120 may be performed by a weighting component as described with reference to FIGS. 7 through 9.

At 1125 the database server may calculate a closeness score for the first user identifier and the second user identifier based on an aggregation of the assigned weighted values. The operations of 1125 may be performed according to the methods described herein. In certain examples, aspects of the operations of 1125 may be performed by a scoring component as described with reference to FIGS. 7 through 9.

At 1130 the database server may transmit an indication of the closeness score. The operations of 1130 may be performed according to the methods described herein. In certain examples, aspects of the operations of 1130 may be performed by a transmission component as described with reference to FIGS. 7 through 9.

At 1135 the database server may receive a new communication message associated with the first user identifier and the second user identifier. The operations of 1135 may be performed according to the methods described herein. In certain examples, aspects of the operations of 1135 may be performed by a graph updating component as described with reference to FIGS. 7 through 9.

At 1140 the database server may extract new metadata from the new communication message. The operations of 1140 may be performed according to the methods described herein. In certain examples, aspects of the operations of 1140 may be performed by a graph updating component as described with reference to FIGS. 7 through 9.

At 1145 the database server may update the distributed graph representation based on the extracted new metadata. The operations of 1145 may be performed according to the methods described herein. In certain examples, aspects of the operations of 1145 may be performed by a graph updating component as described with reference to FIGS. 7 through 9.

Figure 12:
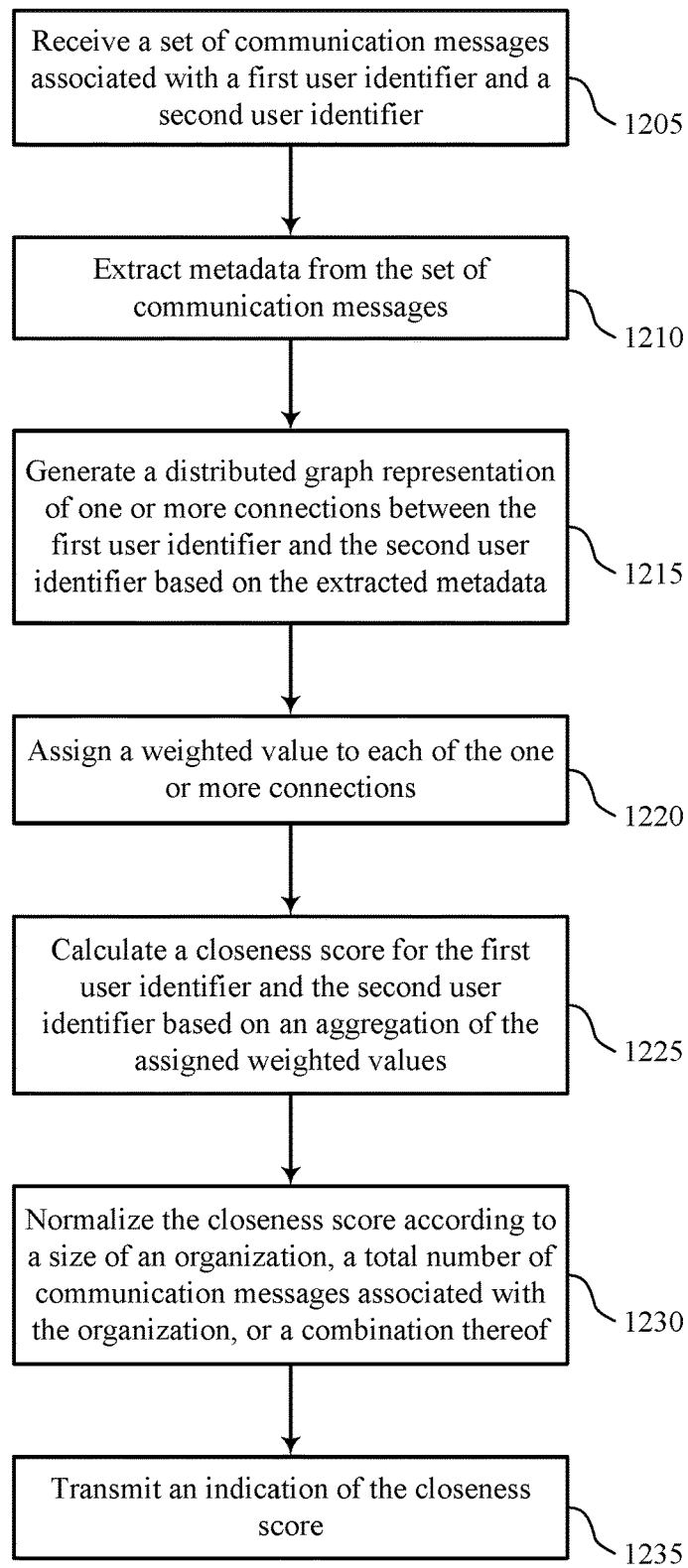

FIG. 12 shows a flowchart illustrating a method 1200 for calculating relationship strength using an activity-based distributed graph in accordance with aspects of the present disclosure. The operations of method 1200 may be implemented by a database server or its components as described herein. For example, the operations of method 1200 may be performed by a connection analysis module as described with reference to FIGS. 7 through 9. In some examples, a database server may execute a set of codes to control the functional elements of the device to perform the functions described below. Additionally or alternatively, the database server may perform aspects of the functions described below using special-purpose hardware.

At 1205 the database server may receive a set of communication messages associated with a first user identifier and a second user identifier. The operations of 1205 may be performed according to the methods described herein. In certain examples, aspects of the operations of 1205 may be performed by a reception component as described with reference to FIGS. 7 through 9.

At 1210 the database server may extract metadata from the set of communication messages, where the metadata includes at least a timestamp associated with each message of the set of communication messages. The operations of 1210 may be performed according to the methods described herein. In certain examples, aspects of the operations of 1210 may be performed by a metadata extraction component as described with reference to FIGS. 7 through 9.

At 1215 the database server may generate a distributed graph representation of one or more connections between the first user identifier and the second user identifier based on the extracted metadata. The operations of 1215 may be performed according to the methods described herein. In certain examples, aspects of the operations of 1215 may be performed by a graph generation component as described with reference to FIGS. 7 through 9.

At 1220 the database server may assign a weighted value to each of the one or more connections, where the weighted value is based on an analysis of the extracted metadata. The operations of 1220 may be performed according to the methods described herein. In certain examples, aspects of the operations of 1220 may be performed by a weighting component as described with reference to FIGS. 7 through 9.

At 1225 the database server may calculate a closeness score for the first user identifier and the second user identifier based on an aggregation of the assigned weighted values. The operations of 1225 may be performed according to the methods described herein. In certain examples, aspects of the operations of 1225 may be performed by a scoring component as described with reference to FIGS. 7 through 9.

At 1230 the database server may normalize the closeness score according to a size of an organization, a total number of communication messages associated with the organization, or a combination thereof. The operations of 1230 may be performed according to the methods described herein. In certain examples, aspects of the operations of 1230 may be performed by a normalizing component as described with reference to FIGS. 7 through 9.

At 1235 the database server may transmit an indication of the closeness score. The operations of 1235 may be performed according to the methods described herein. In certain examples, aspects of the operations of 1235 may be performed by a transmission component as described with reference to FIGS. 7 through 9.

A method of communication data processing at a database server is described. The method may include receiving a plurality of communication messages associated with a first user identifier and a second user identifier, extracting metadata from the plurality of communication messages, wherein the metadata comprises at least a timestamp associated with each of the plurality of communication messages, and generating a distributed graph representation of one or more connections between the first user identifier and the second user identifier based at least in part on the extracted metadata. The method may further include assigning a weighted value to each of the one or more connections, wherein the weighted value is based at least in part on an analysis of the extracted metadata, calculating a closeness score for the first user identifier and the second user identifier based at least in part on an aggregation of the assigned weighted values, and transmitting an indication of the closeness score.

An apparatus for communication data processing at a database server is described. The apparatus may include a processor, memory in electronic communication with the processor, and instructions stored in the memory. The instructions may be operable to cause the processor to receive a plurality of communication messages associated with a first user identifier and a second user identifier, extract metadata from the plurality of communication messages, wherein the metadata comprises at least a timestamp associated with each of the plurality of communication messages, and generate a distributed graph representation of one or more connections between the first user identifier and the second user identifier based at least in part on the extracted metadata. The instructions may be further operable to cause the processor to assign a weighted value to each of the one or more connections, wherein the weighted value is based at least in part on an analysis of the extracted metadata, calculate a closeness score for the first user identifier and the second user identifier based at least in part on an aggregation of the assigned weighted values, and transmit an indication of the closeness score.

A non-transitory computer-readable medium for communication data processing at a database server is described. The non-transitory computer-readable medium may include instructions operable to cause a processor to receive a plurality of communication messages associated with a first user identifier and a second user identifier, extract metadata from the plurality of communication messages, wherein the metadata comprises at least a timestamp associated with each of the plurality of communication messages, and generate a distributed graph representation of one or more connections between the first user identifier and the second user identifier based at least in part on the extracted metadata. The instructions may be further operable to cause the processor to assign a weighted value to each of the one or more connections, wherein the weighted value is based at least in part on an analysis of the extracted metadata, calculate a closeness score for the first user identifier and the second user identifier based at least in part on an aggregation of the assigned weighted values, and transmit an indication of the closeness score.

Some examples of the method, apparatus, and non-transitory computer-readable medium described above may further include processes, features, means, or instructions for performing an NLP analysis of text of the plurality of communication messages, wherein extracting the metadata may be based at least in part on the NLP analysis.

Some examples of the method, apparatus, and non-transitory computer-readable medium described above may further include processes, features, means, or instructions for identifying a relevancy value for each communication message of the plurality of communication messages based at least in part on the NLP analysis or a characteristic of the communication message. Some examples of the method, apparatus, and non-transitory computer-readable medium described above may further include processes, features, means, or instructions for removing a communication message from the plurality of communication messages if an associated relevancy value is below a relevancy threshold.

In some examples of the method, apparatus, and non-transitory computer-readable medium described above, the NLP analysis comprises analyzing a test dataset of communication messages to determine a list of words to search for in the text. Some examples of the method, apparatus, and non-transitory computer-readable medium described above may further include processes, features, means, or instructions for performing a word inventing procedure to determine an additional list of words to search for in the text, wherein the additional list of words may be not present in the test dataset of communication messages. Some examples of the method, apparatus, and non-transitory computer-readable medium described above may further include processes, features, means, or instructions for searching the text of the plurality of communication messages for any words included in the list of words or the additional list of words.

Some examples of the method, apparatus, and non-transitory computer-readable medium described above may further include processes, features, means, or instructions for receiving a new communication message associated with the first user identifier and the second user identifier. Some examples of the method, apparatus, and non-transitory computer-readable medium described above may further include processes, features, means, or instructions for extracting new metadata from the new communication message. Some examples of the method, apparatus, and non-transitory computer-readable medium described above may further include processes, features, means, or instructions for updating the distributed graph representation based at least in part on the extracted new metadata.

Some examples of the method, apparatus, and non-transitory computer-readable medium described above may further include processes, features, means, or instructions for normalizing the closeness score according to a size of an organization, a total number of communication messages associated with the organization, or a combination thereof.

In some examples of the method, apparatus, and non-transitory computer-readable medium described above, the distributed graph representation may be a first tenant-specific distributed graph representation corresponding to a first tenant of a multi-tenant database system. Some examples of the method, apparatus, and non-transitory computer-readable medium described above may further include processes, features, means, or instructions for generating a second tenant-specific distributed graph representation corresponding to a second tenant of the multi-tenant database system. Some examples of the method, apparatus, and non-transitory computer-readable medium described above may further include processes, features, means, or instructions for updating the first tenant-specific distributed graph representation with connection information of the second tenant-specific distributed graph representation according to a tenant information sharing policy.

Some examples of the method, apparatus, and non-transitory computer-readable medium described above may further include processes, features, means, or instructions for identifying a third user identifier. Some examples of the method, apparatus, and non-transitory computer-readable medium described above may further include processes, features, means, or instructions for removing one or more communication messages associated with the third user identifier from the plurality of communication messages based at least in part on receiving a volume of communication messages associated with the third user identifier greater than a threshold volume of communication messages.

In some examples of the method, apparatus, and non-transitory computer-readable medium described above, the distributed graph representation indicates an edge direction between user identifiers, the timestamp associated with each of the plurality of communication messages, a sender and corresponding sender information associated with each of the plurality of communication messages, a recipient and corresponding recipient information associated with each of the plurality of communication messages, an event type associated a communication message, one or more portions of text associated with the communication message, or a combination thereof.

In some examples of the method, apparatus, and non-transitory computer-readable medium described above, the plurality of communication messages comprises emails, calendar events, service tickets, SMS text messages, voice calls, social media messages, documents, activities, or a combination thereof.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
    retrieving a plurality of communication messages between a first plurality of users in a tenant organization and a second plurality of users in a target organization;
    filtering the plurality of communication messages before using a neural network to generate a plurality of vectors corresponding to a plurality of words in the plurality of filtered communication messages, wherein filtering a communication message comprises removing a first portion of the communication message, extracting a second portion of the communication message, and replacing one or more words in the second portion of the communication message with placeholder values;
    generating a distributed graph representation of connections between the first plurality of users in the tenant organization and the second plurality of users in the target organization based at least in part on identifying one or more associations between the plurality of vectors generated by the neural network;
    assigning weighted values to the connections in the distributed graph representation, wherein a connection between a first user in the tenant organization and a second user in the target organization is assigned a weighted value based at least in part on a total number of communication messages involving the first user and the second user and response times between communication messages involving the first user and the second user;
    calculating closeness scores between the first plurality of users in the tenant organization and the second plurality of users in the target organization based at least in part on assigning the weighted values to the connections;
    identifying that the first user of the tenant organization is connected to the second user of the target organization based at least in part on the closeness scores; and
    transmitting, for display in a user interface, an indication of contact information for the first user in the tenant organization, contact information for the second user in the target organization, and a closeness score between the first user and the second user.

2. The method of claim 1, further comprising:
    extracting metadata from the plurality of filtered communication messages based at least in part on an NLP analysis of the plurality of vectors corresponding to the plurality of words in the plurality of filtered communication messages.

3. The method of claim 2, further comprising:
    identifying relevancy values for the plurality of filtered communication messages based at least in part on the NLP analysis.

4. The method of claim 1, further comprising:
    removing a communication message from the plurality of communication messages if a relevancy value associated with the communication message is below a relevancy threshold.

5. The method of claim 1, further comprising:
    analyzing a test dataset of communication messages to determine a list of words to search for in the plurality of communication messages;
    determining an additional list of words to search for in the plurality of communication messages, wherein the additional list of words is not present in the test dataset of communication messages; and
    searching the plurality of communication messages for words from the list of words or the additional list of words.

6. The method of claim 1, further comprising:
    receiving a new communication message between the first user and a second user in the target organization;
    extracting new metadata from the new communication message; and
    updating the distributed graph representation based at least in part on the new metadata.

7. The method of claim 1, further comprising:
    normalizing the closeness scores according to a size of the tenant organization, a total number of communication messages between the first plurality of users and the second plurality of users, or both.

8. The method of claim 1, wherein the distributed graph representation is a first tenant-specific distributed graph representation corresponding to a first tenant of a multi-tenant database system, the method further comprising:
    generating a second tenant-specific distributed graph representation corresponding to a second tenant of the multi-tenant database system.

9. The method of claim 8, further comprising:
    updating the first tenant-specific distributed graph representation with connection information of the second tenant-specific distributed graph representation according to a tenant information sharing policy.

10. The method of claim 1, further comprising:
    removing, from the plurality of communication messages, one or more communication messages associated with a second user in the tenant organization based at least in part on determining that a volume of communication messages associated with the second user is greater than a threshold.

11. The method of claim 1, wherein the distributed graph representation indicates an edge direction between user identifiers, timestamps associated with the plurality of communication messages, sender information associated with the plurality of communication messages, recipient information associated with the plurality of communication messages, an event type associated a communication message, one or more portions of text associated with the communication message, or a combination thereof.

12. The method of claim 1, wherein the plurality of communication messages comprise emails, calendar events, service tickets, short message service (SMS) text messages, voice calls, social media messages, documents, activities, or a combination thereof.

13. The method of claim 1, wherein the transmitting comprises:
    transmitting, for display in the user interface, an indication of contact information for the first user in the tenant organization, contact information for the second user in the target organization, the closeness score between the first user and the second user, a connection rank associated with the closeness score, and a connection rationale for the connection rank.

14. An apparatus for data processing, comprising:
a processor;
memory in electronic communication with the processor; and
instructions stored in the memory and executable by the processor to cause the apparatus to:
retrieve a plurality of communication messages between a first plurality of users in a tenant organization and a second plurality of users in a target organization;
filter the plurality of communication messages before using a neural network to generate a plurality of vectors corresponding to a plurality of words in the plurality of filtered communication messages, wherein, to filter a communication message, the instructions are executable by the processor to cause the apparatus to remove a first portion of the communication message, extract a second portion of the communication message, and replace one or more words in the second portion of the communication message with placeholder values;
generate a distributed graph representation of connections between the first plurality of users in the tenant organization and the second plurality of users in the target organization based at least in part on identifying one or more associations between the plurality of vectors generated by the neural network;
assign weighted values to the connections in the distributed graph representation, wherein a connection between a first user in the tenant organization and a second user in the target organization is assigned a weighted value based at least in part on a total number of communication messages involving the first user and the second user and response times between communication messages involving the first user and the second user;
calculate closeness scores between the first plurality of users in the tenant organization and the second plurality of users in the target organization based at least in part on assigning the weighted values to the connections;
identify that the first user of the tenant organization is connected to the second user of the target organization based at least in part on the closeness scores; and
transmit, for display in a user interface, an indication of contact information for the first user in the tenant organization, contact information for the second user in the target organization, and a closeness score between the first user and the second user.

15. The apparatus of claim 14, wherein the instructions are further executable by the processor to cause the apparatus to:
extract metadata from the plurality of filtered communication messages based at least in part on an NLP analysis of the plurality of vectors corresponding to the plurality of words in the plurality of filtered communication messages.

16. The apparatus of claim 14, wherein the instructions are further executable by the processor to cause the apparatus to:
receive a new communication message between the first user and a second user in the target organization;
extract new metadata from the new communication message; and
update the distributed graph representation based at least in part on the new metadata.

17. The apparatus of claim 14, wherein the instructions are further executable by the processor to cause the apparatus to:
normalize the closeness scores according to a size of the tenant organization, a total number of communication messages between the first plurality of users and the second plurality of users, or both.

18. A non-transitory computer-readable medium storing code for data processing, the code comprising instructions executable by a processor to:
retrieve a plurality of communication messages between a first plurality of users in a tenant organization and a second plurality of users in a target organization;
filter the plurality of communication messages before using a neural network to generate a plurality of vectors corresponding to a plurality of words in the plurality of filtered communication messages, wherein, to filter a communication message, the instructions are executable by the processor to remove a first portion of the communication message, extract a second portion of the communication message, and replace one or more words in the second portion of the communication message with placeholder values;
generate a distributed graph representation of connections between the first plurality of users in the tenant organization and the second plurality of users in the target organization based at least in part on identifying one or more associations between the plurality of vectors generated by the neural network;
assign weighted values to the connections in the distributed graph representation, wherein a connection between a first user in the tenant organization and a second user in the target organization is assigned a weighted value based at least in part on a total number of communication messages involving the first user and the second user and response times between communication messages involving the first user and the second user;
calculate closeness scores between the first plurality of users in the tenant organization and the second plurality of users in the target organization based at least in part on assigning the weighted values to the connections;
identify that the first user of the tenant organization is connected to the second user of the target organization based at least in part on the closeness scores; and
transmit, for display in a user interface, an indication of contact information for the first user in the tenant organization, contact information for the second user in the target organization, and a closeness score between the first user and the second user.

19. The non-transitory computer-readable medium of claim 18, wherein the instructions are further executable by the processor to:
extract metadata from the plurality of filtered communication messages based at least in part on an NLP analysis of the plurality of vectors corresponding to the plurality of words in the plurality of filtered communication messages.

20. The non-transitory computer-readable medium of claim 18, wherein the instructions are further executable by the processor to:
receive a new communication message between the first user and a second user in the target organization;
extract new metadata from the new communication message; and
update the distributed graph representation based at least in part on the new metadata.

* * * * *